US012784073B2

(12) United States Patent
Subbloie et al.

(10) Patent No.: US 12,784,073 B2
(45) **Date of Patent: *Nov. 3, 2026**

(54) FACILITY SMART ENERGY MANAGEMENT

(71) Applicant: Budderfly, Inc., Shelton, CT (US)

(72) Inventors: Albert Subbloie, Orange, CT (US); Paul Schmidt, Rock Hill, CT (US)

(73) Assignee: Budderfly, Inc., Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/890,333

(22) Filed: Sep. 19, 2024

(65) Prior Publication Data

US 2025/0014067 A1 Jan. 9, 2025

Related U.S. Application Data

(63) Continuation of application No. 17/018,828, filed on Sep. 11, 2020, now Pat. No. 12,106,324, which is a continuation-in-part of application No. 16/119,479, filed on Aug. 31, 2018, now Pat. No. 10,810,690.

(51) Int. Cl.

| | |
|---|---|
| ***G06Q 50/06*** | (2024.01) |
| ***G06Q 10/0631*** | (2023.01) |
| ***G06Q 30/0226*** | (2023.01) |
| ***G06Q 30/04*** | (2012.01) |
| ***H02J 3/00*** | (2006.01) |

(52) U.S. Cl.

CPC ... *G06Q 30/0226* (2013.01); *G06Q 10/06315* (2013.01); *G06Q 30/04* (2013.01); *H02J 3/003* (2020.01); *G06Q 50/06* (2013.01)

(58) Field of Classification Search

CPC ...... G06Q 50/06; G06Q 30/04; G06Q 20/102; G06Q 20/14

See application file for complete search history.

(56) References Cited

U.S. PATENT DOCUMENTS

| | | | |
|---|---|---|---|
| 2003/0055677 | A1 | 3/2003 | Brown |
| 2009/0048901 | A1 | 2/2009 | Richard et al. |
| 2012/0215369 | A1 | 8/2012 | Desai |
| 2012/0260194 | A1 | 10/2012 | Kennedy |
| 2012/0296799 | A1 | 11/2012 | Playfair |

(Continued)

OTHER PUBLICATIONS

"Building Energy Management Systems (BEMS)," in Energy Conservation in Residential, Commercial, and Industrial Facilities , IEEE, 2018, pp. 15-81, doi: 10.1002/9781119422099.ch2 (Year: 2018).*

(Continued)

*Primary Examiner* — Michael P Harrington
(74) *Attorney, Agent, or Firm* — Farber LLC

(57) ABSTRACT

A system of modules which evaluate, control and measure energy usage and signatures at a building that are in communication with software executing on a computer controlled by a third-party. Software executes on the computer to compare energy usage and signatures of equipment at the facility with information in a database accessible by the computer and is adapted to adjust a Building Management System to modify the operation of at least one piece of equipment at the facility based on the comparison third-party. The database including information and filters for dynamic system adaptation to changing environmental factors.

18 Claims, 18 Drawing Sheets

(56) References Cited

U.S. PATENT DOCUMENTS

| | | | | |
|---|---|---|---|---|
| 2014/0129160 | A1* | 5/2014 | Tran | G01W 1/00 702/61 |
| 2016/0290671 | A1 | 10/2016 | Schuster | |
| 2017/0234562 | A1 | 8/2017 | Ribbich | |
| 2021/0148996 | A1 | 5/2021 | Paul | |

OTHER PUBLICATIONS

Foong, Keat. "Outsourcing Bills can Bring Headache Relief-and Savings, Too." Multi-Housing News 40.10 (2005): 38. ProQuest. Web. Mar. 5, 2024. (Year: 2005).

Prepaid electricity plan and electricity consumption behavior. (2017). Contemporary Economic Policy, 35( 1), 125. Retrieved from https://dialog.proquest.com/professional/docview/1856716248?accountid= 131444 (Year 2017).

Mazibuko, G. P. (2013). The impact of the municipal billing system on revenue collection in selected south african ities {Order No. 1595839). Available from ProQuest Dissertations and Theses Professional. (1704412482). {Year: J013).

* cited by examiner

Mild cooling (5 -13 CDD): 10.6% Savings

PDM EXAMPLE: ST. JOSEPH EVENING BREAK BAKE

FACILITY SMART ENERGY MANAGEMENT

FIELD OF THE INVENTION

The application relates to a business method and system for controlling energy usage and costs and more particularly, to a method for estimating and pre-billing energy usage of a third-party over a given time period and for managing the third-party energy usage over the given time period.

BACKGROUND OF THE INVENTION

Technological advances driven by a desire for energy savings and the sensitivity to environmental concerns continue to fuel the availability of new and improved devices and materials, which result in more efficient energy usage. These include more efficient lighting, HVAC systems, construction materials, components and smart devices. IoT (Internet of Things) sensors and controls capable of switching these devices on and off, adjusting their settings, as well as monitoring their operation and their efficiency add a new dimension of software control to obtaining energy efficiency. The average company or individual is rarely able to effectively navigate this ever-changing maze of options that are appearing on the market at an accelerating pace.

The management and control of energy usage and related services is difficult for commercial establishments to manage. Piecemeal installation of energy efficient upgrades or smart energy control devices can have a greater or lesser impact depending on installation, operation and maintenance of the equipment. For example, a company may spend resources to install more energy efficient equipment, however, poor maintenance or improper installation can cause the new equipment to wear out quickly or to run outside of the manufacturer's estimated guidelines resulting in a much lower return on investment than expected. This challenge becomes even more difficult where an entity has multiple commercial establishments in geographically and climate diverse locations.

Once installed these upgrades need to be managed to ensure a proper return on the reduction of energy expenses. The actual performance of the upgrades is difficult to measure, as few solutions exist that provide a real-time measurement capability granular enough for effective management. The measurement, control and management of energy consumption is a secondary task the business is concerned with and energy management typically does not fall within the expertise of the business entity. Additionally, outsourcing this function is not easy. With the fragmented nature of energy efficiency providers, the business would need to engage with multiple suppliers and then manage/monitor the devices installed by those suppliers on their own. Most of these multi-supplier solutions are not integrated. Therefore, to effectively implement any holistic energy solution, the business would need to expend significant resources hiring personnel and building integration between disparate systems.

More recently, there has been a significant expansion in the availability of IoT (Internet of Things) devices that are considered "smart" because these devices are remotely controllable, i.e. via a network connection, such as, the Internet or a mobile device. The difficulty with these devices is that, again they represent a fragmented set of devices that are not integrated and require the company to install and manage the devices and their controllers. This is often not practical or possible. Furthermore, these devices do not integrate well with the decision process as to when to use renewable versus utility supplier power and how and when the utility supplier charges for energy usage, including complex demand charge management where, for example, the rate changes based on the peak or maximum energy usage rate during a given time period. Most of these devices are configured to be controlled based on set schedules only and without regard to actual usage, time of usage or usage cycling. Further, there is no knowledge of usage of concurrent devices, other upgrades, or demand. Even if these devices offer some individual device level utilization measurement capability, demand peak and peak management metrics are related to the energy utilization of the facility as a whole and not any single device. Without knowledge of the overall utilization of energy, the control and energy savings cannot be done efficiently. Managing the whole gamut of devices installed requires integration with software systems to measure and collect this data and to make control decisions based on a holistic view. No such system is currently able to achieve this type of over-arching and precise control.

While there are some models where companies offer to sell and even finance the cost of energy savings equipment, this approach provides only partial savings. For example, while a more efficient LED light can reduce energy usage compared to other light fixtures, additional controls that turn these light fixtures on/off can provide still further savings. The same principle applies to heating and cooling equipment, manufacturing equipment and other commercial equipment. While the simple installation of the components is only one aspect of an optimal energy saving solution, additional efficiencies can only be gained though monitoring and controlling these devices coupled with knowledge of the businesses usage patterns and utility billing models.

Therefore, a need exists for an integrated energy usage measurement, management and control solution that results in reduced energy usage.

SUMMARY OF THE INVENTION

Therefore, it is an object of the present invention to provide improved energy usage controls and a billing model reflective of those controls.

It is further desired to provide a system and method to reduce energy usage and expense in a reliable and predicable manner across multiple facilities with a further desire to obtain additional benefits and advantages when operating buildings and facilities in a coordinated manner across multiple facilities spread over a geographically diverse area.

It is also desired to provide a system and method for a first-party (an energy management company) to be responsible for monitoring and controlling the energy usage of a third-party (typically an energy consumer) and for payment of an energy bill to a second-party (typically a utility company). In preferred embodiments, billing provided from the first-party to the third-party can be adjusted for rate changes reflected in the energy bill from the second-party.

It is desired to provide a system and method by which energy consumers can benefit from the energy savings without the necessity of these users having to spend vast amounts of capital on upgrades or to become energy experts and device integration experts themselves.

Existing approaches to energy savings typically comprise a company selling and even financing the cost of energy efficient equipment to an energy consumer. While the equipment installed is more efficient, this approach provides limited energy reduction. In the proposed approach disclosed herein, a system and method that comprises management of a third-party's energy usage, additional usage reductions that can be achieved through the smart control and management of devices. The third-party is issued an energy bill by the first-party that is responsible for paying for the actual energy usage of the third-party. However, the energy bill issued by the first-party to the third-party for the current period is issued independently from the actual bill received from the second-party and may be created prior to the bill from the second-party being issued. This means the charge to the third-party for a given billing period of electricity usage is not based on the actual amount of electricity used for that particular billing period. This departs from the traditional way in which energy is paid for, especially electrical utilities that are often based on actual KW/hr usage and on peak demand charges for a given time period.

As a further departure from the traditional way in which energy is paid for, the proposed approach disclosed herein also accounts for fluctuations in per usage rates i.e. dollars per KW/KWhr. Particularly, traditional systems result in the user of the utility being billed at least in part based on the amount of energy used in a billing time period multiplied by the rate for that same time period. Although the third-party is billed similar to this in the proposed approach herein, the third-party is charged a pre-determined amount by the first-party typically derived from previous time periods regardless of the amount of electricity used for the usage-based components of the energy bill. Further, this energy bill is normalized over a monthly period to simplify accounting and the non-usage components of the invoice are extrapolated from the prior months bill from the second-party.

For example, a user's energy consumption history on a month to month basis is typically used to determine a baseline energy consumption value for what would be the expected usage for any given month in the future, the AMU (Average Monthly Usage). This amount is then discounted based on expected savings that are shared between the first-party (the energy management company) and the third-party (the energy consumer) obtained via capital upgrades and enhancements made to the operation of the third-party by the first-party and the efficient monitoring and control of these. The new rate for usage (typically negotiated for the upcoming year or two) is applied to these discounted usage amounts to come up with the usage-based components of the bill. It should be noted that the first-party often has expertise to negotiate these rates with the second-party (the energy supplier) that the third-party may be lacking and may thus also be able to obtain additional discounts. This may be by recognizing and highlighting off peak usage, or even by validating and possibly reclassifying businesses into standard classifications entitled to preferential rates from the second-party.

Thus, the third-party will now receive an invoice by calendar month for a fixed amount of usage multiplied by the new rate from the first-party. The non-usage-based charges are also added to the invoice and extrapolated from the prior month. If later it is determined that these values went up or down when the actual invoice arrives, subsequent invoices are generated to account for this accordingly.

The invoices generated by the second-party for the actual usage are sent to the first-party who assumes the responsibility for their payment.

The actual usage by the third-party will be measured closely to ensure that the actual usage is close to the approximation. The determination of this approximation is described later herein. If there is a significant deviation and such a deviation exceeds a threshold level, the system will trigger an alarm to alert the energy management company (the first party) of the unexpected energy usage so that the deviation can be investigated and potentially mitigated. The purpose here is to catch substantial changes to the energy consumption patterns such as, for example but not limited to: the installation of new equipment, the addition of shifts and/or new tenants in a facility. Normal variance based on typical usage is expected and accounted for in the model and will not result in any change to the invoice.

In such a model, the first-party in implementing the controls and upgrades to the systems of the third-party expects to achieve substantial reductions in the energy usage and thus savings in the bills received from the second-party for actual usage incurred. Further the introduction and correlation of data from multiple sensors and even from outside data feeds and systems as described in the proposed model can add substantial savings to the model. The controls to monitor and maintain the upgraded equipment, a series of sensors to manage the set points and functioning of said equipment, and the input of outside data feeds and systems are correlated through the use of analytics and machine learning all contribute towards optimizing the energy usage reductions obtained.

Other models offer financing possibilities to companies and are known as ESCOs (energy services companies). Many of these companies assist companies to finance the cost of upgrades and serve to facilitate the installation and use of more efficient equipment. This financing is supported though the assumed savings of energy of these higher efficiency devices. Some ESCOs may even guarantee some measure of savings and base their rates or fees on these savings. However, ESCOs do not typically engage in ongoing energy services and don't take on the long-term energy management services of a company as described in the proposed model.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

Therefore, the objects described, and other objects of the invention are achieved by providing a system of modules (e.g., software modules) that function to measure and control energy usage at a facility. These software modules can be resident on a remote computer or may be resident at the facility. Likewise, the modules may be resident at a controller that is coupled to a network connection connecting a remote computer to the facility, or the modules may be dispersed for local control at the point of equipment power connection to the facility. The data derived from monitoring the various equipment is communicated to a remote computer controlled by a first-party, which comprises an energy management company. In turn, the first-party is responsible for paying the energy bill issued by a second-party, which corresponds to a utility company for the energy used by the third-party being the energy consumer.

In one configuration a method of managing a third-party's energy usage is provided where a first-party pays an energy bill to a second-party for a current billing period corresponding to the third-party's energy usage, the method utilizes a computer coupled to a network and comprises the steps of: obtaining a first energy usage for a first period of time for a first billing period corresponding to the third-party's energy usage for the first period of time and obtaining a second energy usage for a second period of time for a second billing period corresponding to the third-party's energy usage for the second period of time.

The method further comprises the steps of: calculating a baseline energy usage utilizing the first and second energy usages, applying a discount rate to the baseline energy usage to generate a discounted baseline energy usage and applying a per unit rate for a third period of time for a third billing period.

The method still further comprises the steps of: normalizing the existing billing periods from the second-party into monthly periods regardless of the actual billing periods of the second-party creating a new monthly billing period between the first-party and the third-party to simplify accounting and generate a standardized per month charge.

The method still further comprises the steps of: applying the determined per unit rate to the discounted baseline energy usage to generate a calculated energy bill for the newly defined billing period and transmitting the calculated energy bill to the third-party. The method is provided such that the first-party pays a current utility bill issued by the second-party, the current utility bill corresponding to actual energy usage by the third-party during the current billing period.

In another configuration, a system is provided for managing a third-party's energy usage, a first-party paying an energy bill to a second-party for a current billing period corresponding to the third-party's energy usage, the system comprising a computer coupled to a network and an array of sensors gathering data relating to the operation of various equipment at a third-party facility, wherein data relating to the operation of the various equipment is transmitted to the computer via the network.

The system further comprises software executing on the computer and obtaining a first energy usage for a first period of time for a first billing period corresponding to the third-party's energy usage for the first period of time and obtaining a second energy usage for a second period of time for a second billing period corresponding to the third-party's energy usage for the second period of time. The system still further comprises software executing on the computer calculating a baseline energy usage and signature utilizing the first and second energy usages and software executing on the computer applying a discount rate to the baseline energy usage to generate a discounted baseline energy usage. The system also comprises software executing on the computer applying a per unit rate for a third period of time for a third billing period and software executing on the computer applying the determined per unit rate to the discounted baseline energy usage to generate a calculated energy bill for the current billing period. The system is provided such that the calculated energy bill is transmitted to the third-party and the first-party is responsible for paying a current utility bill issued by the second-party, the current utility bill corresponding to actual energy usage by the third-party during the current billing period.

In still another configuration, a method of managing a third-party's energy usage for a facility with a computer having software executing thereon and a storage and coupled to a network is provided comprising the steps of: the computer receiving a first energy usage for the facility for a first period of time corresponding to the third-party's past energy usage for the first period of time; the computer receiving a second energy usage for the facility for a second period of time corresponding to the third-party's past energy usage for the second period of time; and the software executing on the computer determining a baseline energy usage based on the first and second energy usages. The method further comprises the steps of: the software executing on the computer applying a discount rate to the baseline energy usage to generate a discounted baseline energy usage, the discount rate based on an expected reduced energy usage for the facility; the software executing on the computer generating an energy bill for a third period of time; and issuing the energy bill from a first-party to the third-party for a current billing period prior to an end of the current billing period. The method is provided such that the first-party pays a utility bill issued by a second-party for energy usage of the facility during the current billing period. Finally, the methods comprises the steps of: measuring an actual energy usage of a plurality of pieces of equipment at the facility with a plurality of sensors connected to the network to generate measured energy usage; transmitting the measured energy usage to the computer via the network; software executing on the computer comparing the actual energy usage to the discounted baseline energy usage; and software executing on the computer generating an alert when the monitored energy usage deviates a threshold value from the baseline energy usage.

In yet another configuration, a method of managing a third-party's energy usage for a facility with a computer having software executing thereon and a storage and coupled to a network is provided comprising the steps of: the computer receiving a first energy usage for the facility for a first period of time corresponding to the third-party's past energy usage for the first period of time; the computer receiving a second energy usage for the facility for a second period of time corresponding to the third-party's past energy usage for the second period of time; and the software executing on the computer determining a baseline energy usage based on the first and second energy usages. The method further comprises the steps of: the software executing on the computer applying a discount rate to the baseline energy usage to generate a discounted baseline energy usage, the discount rate based on an expected reduced energy usage for the facility; the software executing on the computer generating an energy bill for a third period of time; and issuing the energy bill from a first-party to the third-party for a current billing period prior to an end of the current billing period. The method is provided such that the first-party pays a utility bill issued by a second-party for energy usage of the facility during the current billing period. The method further comprises the steps of: determining an energy usage of at least one of piece of equipment at the facility; comparing the energy usage to a database of information accessible by the computer; and software executing on the computer is adapted to adjust a Building Management System (BMS) to modify the operation of the at least one piece of equipment in the facility based on the comparison of the energy usage to the database of information.

In still another configuration, a method of managing a third-party's energy usage for a facility with a computer having software executing thereon and a storage and coupled to a network is provided comprising the steps of: the computer receiving a first energy signature for the facility for a first period of time corresponding to the third-party's past energy signature for the first period of time; the computer receiving a second energy signature for the facility for a second period of time corresponding to the third-party's past energy usage for the second period of time; and the software executing on the computer determining a baseline energy signature based on the first and second energy usages. The method further comprises the steps of: the software executing on the computer determining a deviation from a baseline energy signature. Finally, the methods comprises the steps of: measuring an actual energy signature of a plurality of pieces of equipment at the facility with a plurality of sensors connected to the network to generate energy signature; transmitting the measured energy signature to the computer via the network; software executing on the computer comparing the actual energy signature to the baseline energy signature; and software executing on the computer generating an alert when the signature deviates by a threshold amount or value from the baseline energy usage.

It should be noted that, while various functions and methods have been described and presented in a sequence of steps, the sequence has been provided merely as an illustration of one advantageous configuration, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Other objects of the invention and its particular features and advantages will become more apparent from consideration of the following drawings and accompanying detailed description.

DETAILED DESCRIPTION OF THE INVENTION

Figure 1:
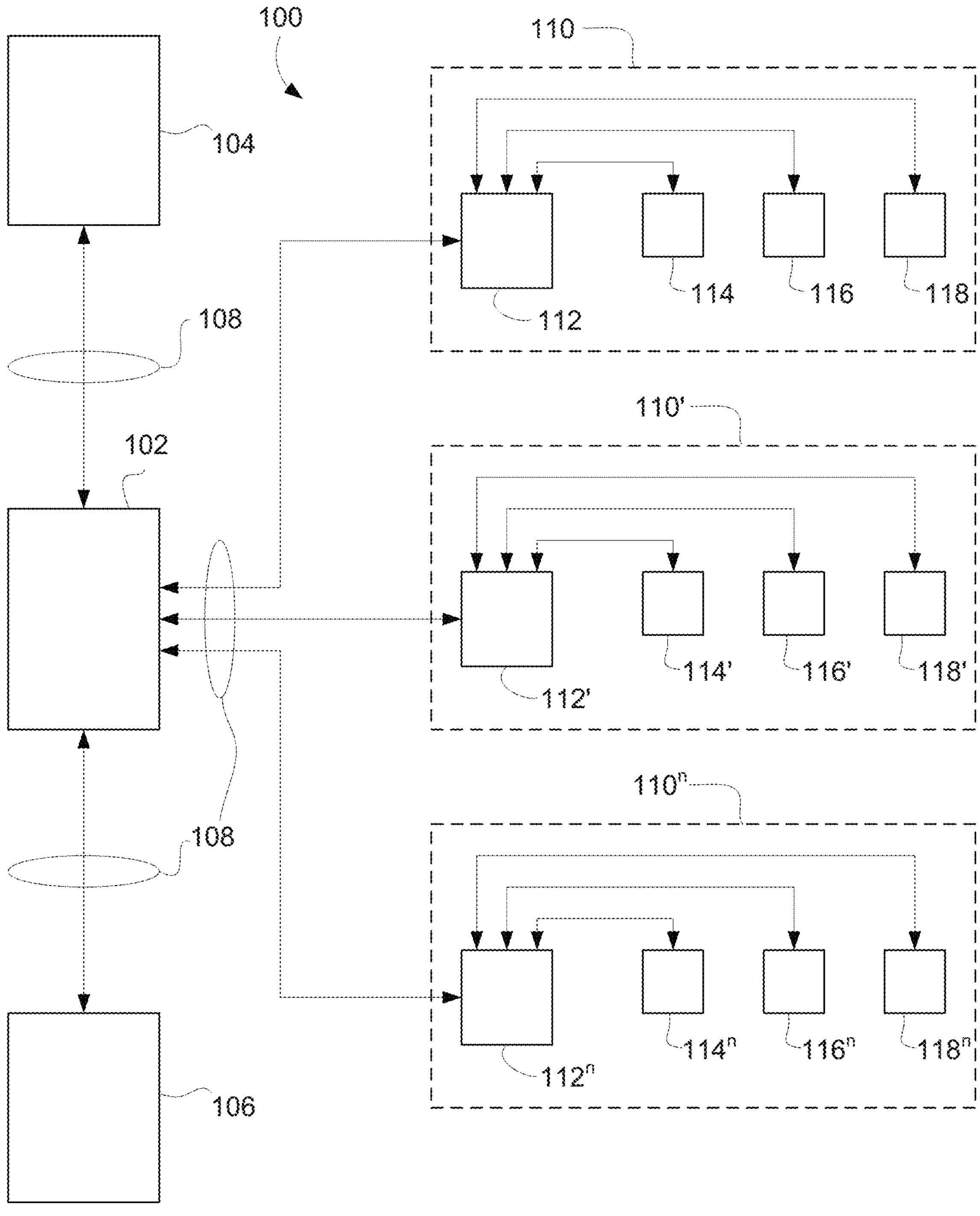
FIG. 1 is a block diagram according to one implementation of the system.

Referring now to the drawings, wherein like reference numerals designate corresponding structure throughout the views. The following examples are presented to further illustrate and explain the present invention and should not be taken as limiting in any regard.

FIG. 1 shows energy management system 100 that comprises a first-party (energy manger) computer 102 coupled to a second-party (energy supplier) computer 104 via a network connection 108. The first-party computer 102 is also coupled to a third-party (energy consumer) computer 106 via network connection 108. Computer 106 may be used for reporting alerts, accessing bills or reports, or the sending and receiving of emails.

The first-party computer 102 is further coupled to various third-party locations 110, 110', **110*n* that may comprise physical retail or commercial establishments. It is contemplated that in one configuration, each of the various third-party locations 110, 110', 110*n* will include a controller 112, 112', 112" each of which are coupled to first-party computer 102 via network connection 108. While controller 112, 112', 112*n*** is depicted at each location, it is contemplated that such a device may or may not be needed.

Control devices 114, 116, 118 are shown coupled to controller 112. These control devices may comprise a device that is used to control various equipment at the third-party location 110. These control devices may control virtually any type of equipment that is installed and operated at the location. Two-way arrows are used in the connection between the controller 112 and the control devices 114, 116, 118. These are provided to indicate that data transmission may be happening in two directions. For example, control device 114 may be connected to a first piece of equipment at the third-party location 110. The control device 114 allows for the operation of the device (e.g., transmission of electrical power or natural gas to an oven). However, the control device also monitors the operation of the first piece of equipment by measuring energy consumption.

It will be understood that energy consumption measurements can be used for many different purposes. For example, if an oven is drawing an unusually high amount of electricity, it could be an indication of a problem with the piece of equipment. This measurement data could then be used to create an alert with respect to the piece of equipment to signal that maintenance is needed. This real-time measurement can greatly shorten the time such a piece of equipment is running in a highly inefficient state to reduce operating cost. Likewise, prompt maintenance could potentially prevent catastrophic failure of the equipment.

An additional use for the real-time measurement of energy usage is that it can provide a database of information on the functioning and cycling of the equipment valuable to many parties including the equipment manufactures themselves. Further, the visibility to and application of historical data provides the ability to do predictive analytics on potential events based on historical patterns leading up to these same events at other sites or with other equipment. Further, the application of machine learning to find these types of patterns is applied.

Once usage patterns are known for the exact pieces of equipment, that equipment can more precisely be controlled to minimize energy usage costs. For example, if a cooler for keeping food items chilled is cycled on in the morning as a store opens up, but also the oven is turned on as well as the lights, HVAC equipment, and so on, this can create a relatively large initial draw of power required to initiate and get all these pieces of equipment up and operational. If the energy usage patterns for each piece of equipment are known, then each piece of equipment can be cycled on in a controlled manner to minimize the peak demand caused by all the equipment. Keeping the peak demand below a set threshold can happen with the individual control and understanding of exactly how and when a piece of equipment will draw power. Additionally, the timing of when certain automated processes occur can be precisely scheduled to minimize instantaneous demand and keep the rate charges below a threshold to control costs.

As was previously stated, it is contemplated that it may be advantageous to directly connect control devices 114, 116, 118 to first-party computer 102 via network connection 108. As the IoT continues to evolve and develop, it is conceived that virtually any of the various equipment in the third-party location can be coupled to first-party computer 102 for monitoring and control.

While three third-party locations 110, 110', 110" are shown in FIG. 1, it is conceived that virtually any number of locations can be connected to and monitored by the first-party computer 102. For example, the third-party locations could comprise various commercial establishments located in diverse geographical locations. It is contemplated that the first-party (the energy management company) typically assumes the responsibility to pay for the energy usage by, for example, a chain of commercial/retail locations. This enables the first-party (energy management company) to deal with the second-party (the utility company) with an aggregated number of locations as a single energy consumer. Having multiple pieces of equipment to control at multiple different locations and facilities allows the energy management company to simultaneously monitor all of the locations and instantaneous energy usage in the aggregate and control the equipment at one location to while the equipment at another location is cycling and so forth. This is possible due, in part, to the instantaneous measurement and control, but also due to the detailed data collected in relation to the specific equipment taking into consideration the time of year and the ambient conditions for all the differing locations.

Figure 2:
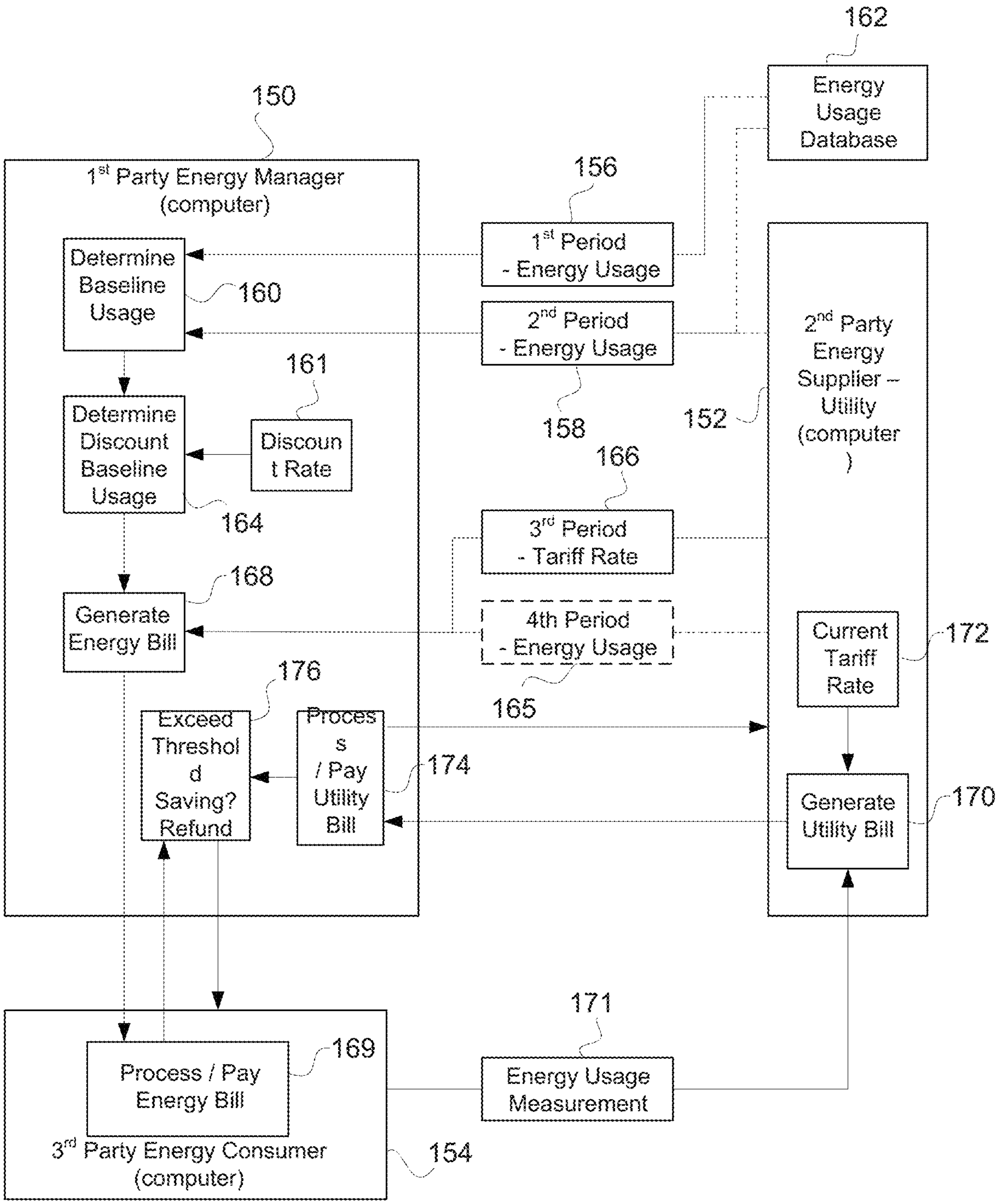
FIG. 2 is a functional block diagram illustrating communications among the first, second and third parties according to FIG. 1.
Figure 3:
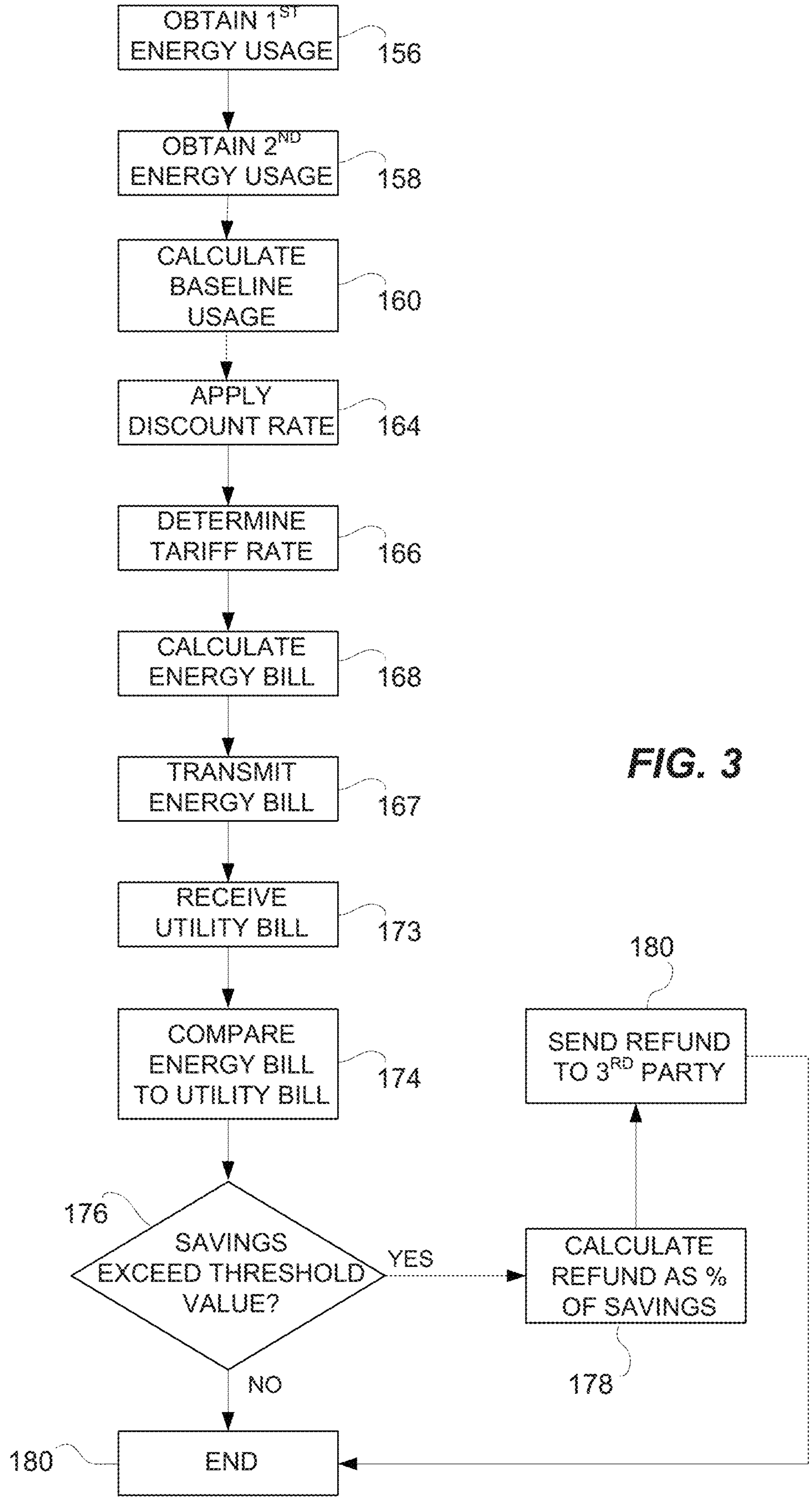
FIG. 3 is a functional flow diagram according to FIG. 2.

Turning now to FIGS. 2 and 3, FIG. 2 is a functional block diagram illustrating the flow of data between the first-party, the second-party and the third-party.

The system enables the function of a business model that is tied to a baseline energy usage with percentage discount that is offered to a client. Shown in FIG. 2 is a first-party 150, a second-party 152 and a third-party 154. The third-party 154 may comprise a food service company that has multiple physical store locations. Each of those locations are supplied with electrical power and the cycling and running of the various equipment each consume electricity. While many companies have in recent years sought to lower power consumption by the replacement and installation of higher efficiency equipment, this approach, while effective does not achieve optimal energy savings for the third-party 154. The savings for the third-party 154 in that instance will be limited to the higher efficiency of the newly installed equipment.

In the described business model, the first-party 150 would contract with the third-party 154 to assume and become liable to pay the energy costs of the third-party 154 but would guarantee a percentage savings when compared with energy usage over a predefined historical period. The third-party 154 is guaranteed energy savings regardless of how much energy is actually used. The first-party 150 has the incentive to lower energy usage as much as possible, while not adversely affecting the running of the third-party's business. For example, once the energy savings has reached the guaranteed savings to the third-party 154, additional energy savings above and beyond that threshold amount can be taken as income for the first-party 150. If dramatic energy savings are obtained, it is contemplated that a formula to split the energy savings between the first and third-party beyond a threshold savings would be applied. This would incentivize both the first and third-party to seek new and innovative solutions to energy savings.

Reference is made to both FIGS. 2 and 3 the first-party 150 receives data relating to energy usage by the third-party for a first period of time 156. For example, this data could be energy usage for a particular billing period that may roughly comprise a calendar month. The first-party 150 also receives data relating to energy usage by the third-party for a second period of time 158. It is contemplated that the second period of time can roughly coincide with the first period of time, just one year later. So, for instance, the first period of time could be the month of July for 2016, while the second period of time could be the month of July for 2017. These two separate billing periods are used to help to determine a baseline energy usage 160 for the month of July for 2018.

It should be noted that bills will be normalized to a calendar month. Sometimes utilities generate billing in cycles other than corresponding to a calendar month (e.g., a 32 day cycle, others 30). A normalized month will be utilized for predictability and to simplify accounting practices.

The historical energy usage could be received from the second-party 152, from the third-party 154 or from another source such as an energy consultant database 162.

The first-party 150 has a discount rate 161 that is to be applied to the energy baseline usage that will correspond to the guaranteed savings the third-party 156 is to receive. For example, the discount could be set in a range of from 5% to 10% and in one configuration will be set at 7%. This means that the third-party will be billed for a 7% reduction in energy usage regardless of the actual amount of savings obtained in usage. It is assumed that actual savings through the upgrades and management will be larger than the 7% reduction passed on to the third-party thus resulting in a profit to the first-party. It should be noted that the 7% is not a guarantee of paying 7% less than the baseline cost for the first and second periods of time. This is due to the fact that certain factors are outside of the control of the first or the third-party. For example, the tariff or transmission costs or other costs charged by the utility (the second-party) may be unilaterally raised or may fluctuate. However, the implementation of the system will result in a real cost savings to the third-party because the actual energy usage will drop by the guaranteed amount. So, while rate increases are passed through to the third-party, the actual cost will take into consideration the guaranteed 7% reduction in usage in determining the costs. Additionally, rate drops that result in larger cost savings can also be passed on to the third-party based on the contract terms.

The discount rate 161 is applied to the baseline energy usage 160 to determine the discounted baseline energy usage 164. The first-party 150 will then receive a per unit rate for a third period 166 that may be provided by the second-party 152. The per unit rate could be a rate charged for Kw/Hr or for virtually any unit of measurement for measuring energy usage. In one configuration, non-usage-based components such as tariffs, taxes, distribution charges and environmental incentives may be added to the invoice in a fixed amount regardless of usage. In another configuration, the third period could correspond to the billing period immediately preceding the current period. So, in the example previously used where the first period is July 2016 and the second period is July 2017, the third period would correspond to June 2018 as the current billing period is July 2018. The result is that the energy bill is generated 168 before or at the beginning of the current billing period before the energy is actually utilized by the third-party 154. This means that the energy bill for the current period is always an estimate of the actual usage that is informed by historical information and calculated discount rates. In still another embodiment, the system could obtain an energy usage for a fourth period 165 of time, which is used to recalculate the baseline energy usage. It is contemplated that the fourth period 165 of time may or may not correspond to the third period 166 of time. For example, if the third-party's energy usage is determined based on a calculation of the first and second period 156, 158 of time and at a later date the energy usage markedly increases due to much greater consumption (e.g., the restaurant cooks and sells a much larger quantity of food), then the baseline energy usage can be recalculated according to the increased energy usage. This fourth period 165 of energy measurement may or may not coincide with the immediately preceding billing period.

The energy bill is transmitted 167 to the third-party 154 that is processed and paid 169 to the first-party 150.

At the end of the current billing period, the second-party 152 will determine the actual energy usage 171 for the current billing period and will generate a utility bill 170, which is received 173 by the first-party 150. The utility bill will be generated based on actual usage as well as the current tariff rate 172, which may or may not correspond to the third period tariff rate 166. The per unit rate 172 may be e.g. in Dollars/KWh. It is understood that other charges such as tariff charges from the utility that are not directly based on actual usage may be passed directly through to the consumer as neither party may have any meaningful control over these charges. These charges may comprise generation rates, or transmission rates, or special assessments to cover maintenance/repair or capital investments in new systems or system upgrades and the like as well as any combination of the above-listed disbursements or charges that are assessed on or to an energy consumer.

The first-party 150 will then process and pay the utility bill 174 and this amount will be used to compare with the discount rate to determine if it exceeds a threshold value 176. For example, the discount rate 161 could be set at 7% such that if the energy usage is dropped by 12%, the 5% savings is income to the first-party 150. However, it could be that the power reduction could be quite significant especially if old equipment is replaced in conjunction with the monitoring and control as defined herein. The system could then calculate a refund to the third-party as a percentage of the savings 178. In one example, if the power savings exceeds 20%, any additional savings in excess of this threshold amount could subject to refund to the third-party 154 or a formula could be applied to split the amount above the threshold between the first-party 150 and third-party 154. In one embodiment, the savings above the threshold could be split 50% to each the first and third parties. Once the refund is calculated, refund can be transmitted to the third-party 180 (FIG. 3) after which the process may end 180 for that billing period. Other scenarios such as determining whether significant excess charges have occurred that warrant revisiting the agreement on charges may also be determined here.

Figure 4:
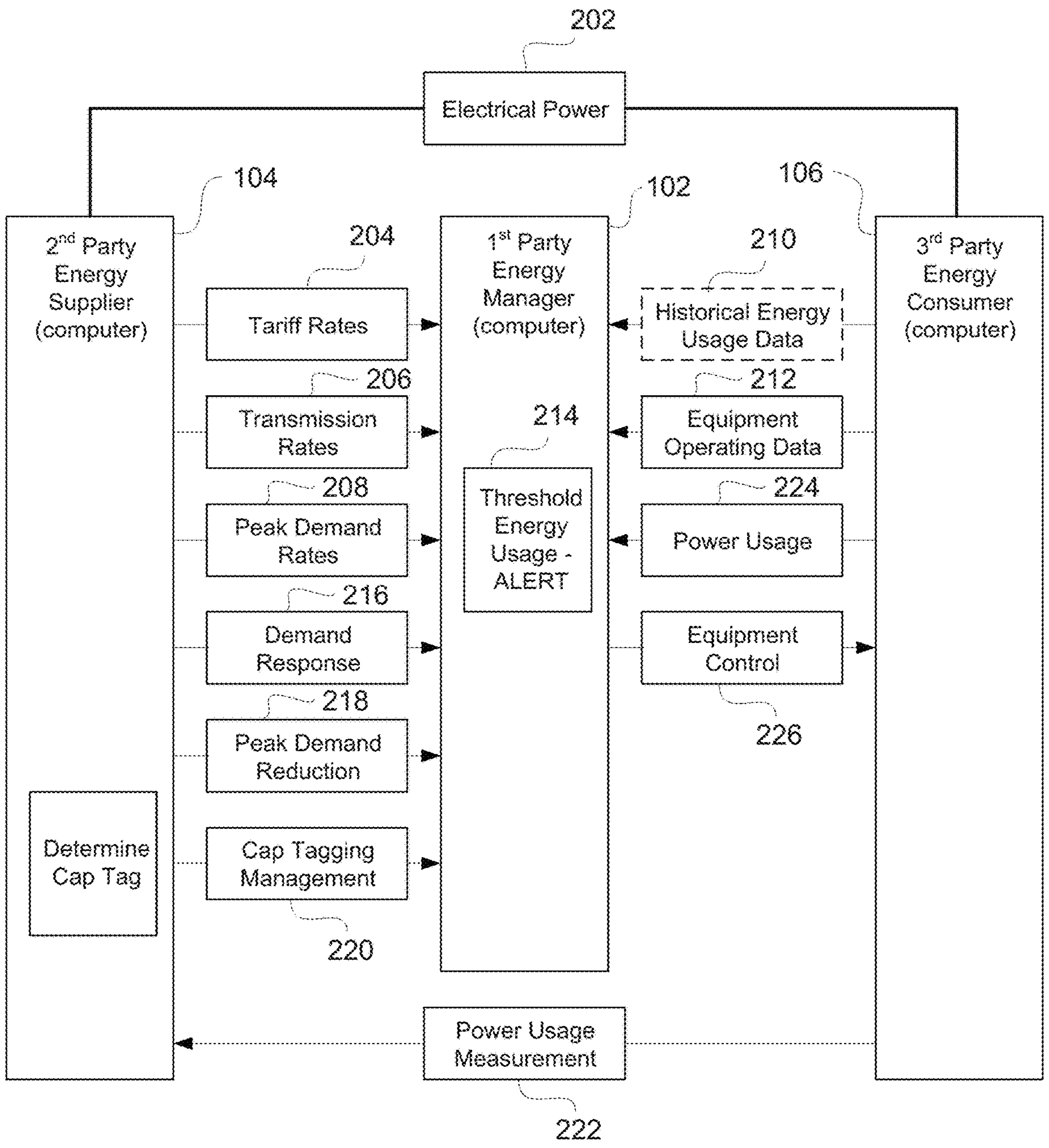
FIG. 4 is a functional block diagram illustrating communications among the first, second and third parties according to FIG. 1.

Turning now to FIG. 4, a description of some of the communications between the first, second and third parties is disclosed. In this particular example, the second part (utility) is supplying electrical power to the third-party (consumer-commercial establishment). The second-party computer 104 may monitor the electrical power 202 that is supplied to the third-party. This could be done via a network connection to remotely monitor the total power consumption. Likewise, the block diagram for the third-party could comprise multiple facilities spread across a wide geographic area. Alternatively, the monitoring of electrical power usage could be done simply by reading the electric meters at all the various locations. It should be noted that the 2nd party computer (104) is diagrammatically representative of a process and this computer may actually comprise multiple computers and may or may not actually be owned or controlled by the utility. For example, a third-party service may supply the information relating to the utility, or some of the information may be gathered from various computer-generated invoices.

Some of the data that is provided by the second-party to the first-party (energy management company) includes data relating to tariff rates 204, data relating to transmission rates 206 and data relating to peak demand rates 208. All this data is collected by the first-party and stored in a database where the first-party uses this data in calculating the control scheme for the various equipment at the third-party facilities.

The first-party will also gather historical data on the energy usage 210. While this data is shown coming from the third-party, it is understood that there are other sources to receive this information, such as, from the second-party (utility) or from yet another party (not shown) including such companies as Urjanet the provide this data as a service. The block diagram shows this data collection in a dashed box to indicate that there are various sources to receive this information that are not limited to the third-party. The last two years of detailed billing data is obtained by the first-party and this data can then be normalized to monthly values corresponding to calendar months. It is understood that many utility bills are often misaligned with calendar months making it difficult to calculate energy at a monthly level and complicates accounting practices. The normalization is done by the first-party computer 102. In this manner, the baseline usage can be determined and applied on a go-forward basis to the particular location for subsequent years. For example, the bill for a contract that started in July 2018 would still utilize July 2016 and 2017 for the baseline usage applied to 2018, 2019 and going forward.

The data on each of the monthly bills may also be split into various categories that should typically appear on the original bill for the third-party. These categories may widely vary and include, for example, meter installation, storage costs for gas, tariffs and environmental initiatives imposed by governments, transmission costs, distribution costs and supply costs based on the consumption.

The supply costs based on consumption are then taken and the data from the last two years for each month is used to set a baseline price. Essentially the amount of energy the customer used for the prior two years during each calendar month. This is done monthly to account for seasonal variance.

This baseline utilization is then adjusted according to an appropriate model for the third-party that determines a 'savings percentage'. Examples include, taking the average usage of the same month during the past two years and subtracting a percentage, taking the lowest value of the same month the last two years and subtracting a percentage and so on. A model is determined by various factors that can determine the savings to be achieved based in part on, the historical energy usage. It will be understood, for example, that a third-party that has recently upgraded the facilities equipment to high efficiency equipment may not realize as much savings through a selected model as another third-party that has very outdated inefficient equipment. Further, a smoothing model can be utilized to compare usage over larger time periods to identify trends and arrive at a more accurate baseline utilization. Particularly, simple averaging provides a generally reliable baseline for facilities/locations that have a relatively standard usage pattern. For example, a sandwich shop would have a relatively predictable usage pattern associated with employees opening at 6 am and turning on ovens, baking bread at 7 am, turn on/up lights and air conditioning/heat and then serve 1000-1200 sandwiches and then closing down for the night. This pattern would repeat on a more or less regular basis throughout the year such that July 2016 would, in all likelihood, be very similar to July 2017 demands due to the number of units sold and reliable operating procedures. Similarly, a large retail department store may have employees arriving at 8 am and turning on/up lights/air/heat and then leaving at 10 pm and turning off/down lights/air/heat. In these two examples the usage pattern from day to day, week to week, month to month and year to year would be relatively predictable. However, a smoothing model could be useful to account for situations where large orders and associated production runs can result increased and unexpected demand. For example, if there is an order for 1,000,000 screen printed t-shirts, extra staff may be brought on, the factory machines and HVAC systems run three shifts a day and the result is a spike in usage. If there are no significant orders for e.g. a two-week period, the factory would not have as high a usage. It may also be noted that in some cases, just the normal process of upgrades over time to more efficient ones can result in a natural skewing to reduce consumption year over year but there are many factors such as unseasonal temperatures, business variability among other things.

A volatility index based on business type or operating entity can be applied and integrated into the business that takes into account the variables in a manner that is fair to both the energy management company and the energy user. For example, if business's energy usage is based on a number of units produced due to the electricity to generate those units, the variability could be accounted for by incorporating some measure of production data. If another business's energy use is highly variable based on weather, a record of weather conditions can be incorporated into the model.

While in most businesses seasonal norms and variability can be addressed in the model by taking monthly averages over prior years and setting the usage amount accordingly, it may be beneficial to incorporate a smoothing model from month to month reducing these monthly variances. Through the use of metering these variances can be distributing over multiple months. For example, through metering it may be determined that the use of ice-cream machines in the summer costs the sum of say $1,200 with the associated known amount of electricity usage. Rather than have the energy bill go up by $400 in the June-July-August months, the model can smooth that over the 12-month period making each month $100 higher to accommodate. It is understood that the baseline utilization would be adjusted by the amount of energy usage associated with the example of a $100 per month charge could vary from month to month depending upon the rate per usage being charged, but the baseline utilization could be adjusted accordingly.

In essence this 'savings percentage' is then used to calculate the expected utilization or the AMU (Average Monthly Usage) in Kw/hr and is fixed for a term of 12 months or more with the third-party. To be clear, this utilization-based reduction is only applicable to the utilization-based component of the invoice. It is possible that Tariffs and other variable portions of the invoice could change (e.g., unilateral rate adjustments by the utility), directly affecting the cost of energy to the third-party. These costs are out of the control of either the first or the third parties.

Another factor that affects the 'saving percentage' is the amount of capital upgrades that are to be performed. This may also affect the contract term. If for example, the third-party is only to receive LED lighting fixture upgrades, the contract term may be shorter and the saving percentage less than in another case where the third-party receives a full set of lighting upgrades, smart plugs, HVAC upgrades and other possible equipment upgrades amounting to a much greater initial capital investment by the first-party.

Once an agreement is reached with the third-party on the proposed model with appropriate upgrades and savings, a number of items happen that allow the first-party to take over the responsibility for the energy bill and to start installing equipment and invoicing the third-party directly. This may be either by becoming the customer of record with the second-party, or becoming the credit party, or even by separately billing via an energy as a service rebilling model. In one embodiment the following process could occur:

A) The third-party essentially cancels the energy account with the second-party and the first-party assumes a new account with the second-party.

B) The first-party generates an invoice to the third-party in a pre-bill model charging for the upcoming month in advance (this is akin to a deposit model used by other utilities). In the pre-bill model the usage portion of the bill is fixed and thus easy to set, but should the variable portions like Tariffs increase, these are carried forward to the customer on the next invoice.

C) The first-party will install the agreed upon (and perhaps additional as seen fit) equipment and monitoring devices at the third-party facility(ies).

D) The first-party will monitor, service, maintain and adjust/upgrade this equipment for the duration of the contract.

It should be understood that the first-party may also attempt to renegotiate better rates with the second-party. In some cases, savings can be had by:

a) Reclassifying the third-party to a different tier or classification to save on rates;
b) Applying knowledge in rating plans to get preferential rates if the consumption patterns of the third-party are such that they are using power off peak hours or in any other way that may provide savings; and
c) Using economies of scale and leverage of the third-party base under the umbrella of the first-party.

In the above cases, if there are savings to be had, these may be divided between the first-party and the third-party to share additional savings on top of the agreed upon discounts.

Turning back to FIG. 4, ongoing monitoring and receipt of equipment operating data 212 is also used to determine service requirements and potential degradation of equipment or other faults requiring adjustment, replacement or service. By utilizing concepts such as threshold-based alerts 214, or in some cases machine learning or predictive analytics, service can be performed and breakdown of equipment avoided for the enterprise. In particular, by learning the particular energy usage patterns of the particular equipment installed at the various third-party locations, the first-party can predictively learn when a particular piece of equipment is failing or needs maintenance to ensure optimal energy usage, a longer lifespan of the equipment or prevent any catastrophic failure of that equipment. This concept not only saves energy costs, but also functions to prevent any disruption to the business and potential loss of inventory (e.g., in the case of frozen or refrigerated goods).

If while monitoring the utilization, peaks and additional consumption is observed due to a change in circumstances (e.g., the installation of new equipment, or the removal of equipment, the addition of new energy consuming devices, the first-party may analyze any consumption differences and have the ability to recalculate or adjust the usage model that is the basis for billing the third-party.

When monitoring energy usage, the system does not simply look at energy usage as a whole being higher or lower. A specific signature or energy usage profile may be examined and used as a comparison in order to both determine a potential problem as well as narrow down the potential causes for such an issue. This method of fingerprinting particular equipment or events serves as a signature for identification. Take for example a compressor in a commercial refrigerator. When such a unit is first purchased it should work in a consistent fashion with other similar units. It is expected that units of the same model from the same manufacturer will perform with very similar is not almost identical profiles. Further, units of the same size and power from different manufacturers will also be expected to perform similarly. When performing upgrades and enhancements, equipment is typically selected with a known power signature or profile. The system includes a database of known behavior (operation or power signature) with an expected profile in a variety of deployments. Further, as the equipment ages, a deterioration of performance is expected and this too is factored into the expected behavior in the database.

Unlike other systems that may measure overall energy usage or energy usage over some interval, the disclosed invention measures not only how much energy is used but also how it is used and the pattern or signature of use. This is determined through the knowledge of how a given piece of equipment is expected to be used in the context of where it is deployed and under normal circumstances. A signature pattern of energy use manifests itself allows the detection of anomalies and the accurate prediction of usage by using pattern matching techniques and comparisons with baseline signatures generated from the equipment In a simple example, the cycle time of the compressor can be considered as it operates to keep the refrigerator at a consistent temperature (e.g., a temperature setpoint). In a well-insulated environment with a partially filled compartment it may be expected that the cycle time in this simplified example to be 10 minutes On and 50 minutes Off. The compressor turns on when the inside of the refrigerator warms up to a threshold and cools it down to a setpoint (which in this example takes 10 minutes) after which it turns off. Again, in this example the compressor stays off and after 50 minutes it determined that the space has warmed up to the threshold setpoint again and the compressor starts again repeating this cycle. In a real word case, there are many other variables such as the temperature differential with the room and the inside of the refrigerator, the amount of food in the compartment, the amount of times the door is open, among others. These can be factored out and compensated for mathematically but we will assume these as constants for the examples below.

Looking at a few examples of common problems it can be seen how this pattern of cycling On/Off can change and how and analysis of the new cycling can be used in problem resolution and dispatch.

In one example, a door to the refrigerator is left open or gets jammed by some of the contents when the unit is overfilled. Now, the compressor works for its typical 10 minutes but is not able to cool the interior to the expected setpoint as warm air is coming in through the opening. Instead of 10 minutes, it takes 20 minutes to cool the interior and for the compressor to shut off. Further, the warm air continues to seep into the unit after the compressor shuts down causing the interior to warm up faster than the typical 50 minutes it would normally take, and the compressor comes on after 10 minutes. In such a case, instead of the usual 10-on, 50-off cycle, we start to see a 20-on, 10-off cycle.

In another case, the compressor is low on refrigerant and has become less efficient as a result. Now, when the compressor works it takes longer than the usual 10 minutes to cool the interior, and depending on the degradation involved it may take 15 minutes. This time may grow over time. Once cooled however, the compartment retains its temperature as normal as the seals are all operating correctly and this cycle remains at 50 minutes. Here, instead of the usual 10-on, 50-off cycle we now start to see a 15-on, 50-off cycle.

In yet another case, the defrost cycle has stopped working and the coils have iced over which have not allowed for a proper defrost cycle to appear. As such the compressor has iced over and is no longer able to cool the unit sufficiently. The cycle has now become a constant cooling with no turn off at all. This an always-on, never-off instead of the expected 10-on, 50-off cycle.

In yet another case, if there is a large outside temperature variation, in cases where the refrigeration coils are outside a longer operating time for the compressor to cool the contents of the refrigerator can be observed. In this instance, outside temperature sensors can be used to measure and compare variances making the expected cooling time dynamically updateable. While it may take 10 minutes allowing for the typical 10-50 scenario when temperatures are +/−15 degrees between the inside and outside temperatures, we may calculate an additional 5 minutes of cooling for every 20 degrees outside of the typical range. Thus a 15-50 would be considered normal in mid-winter or mid-summer.

In yet another case, where the defrost sensing mechanism was malfunctioning, we might see many defrost cycles also leading to a 15-5 (always referring to the cooling and warming cycles inside the refrigerator). In this case however, we can also look at the overall power usage as the defrost warming cycle consumes power and this increased power consumption can be monitored. In other cases, the defrost circuitry could be directly monitored and alerts or events could be triggered if it is operating more or less frequently than established thresholds anticipate.

These cycles, while consistent allow for the setting of thresholds should they start to shift towards any of the known problem scenarios. It should be noted however that even during normal operation, it is expected to see some variance in the ranges of these settings. A refrigerator after all is not meant to stay closed and always have the same contents in it at the temperature setpoint. People will open the door and load it up with warm food, in other cases, people will empty the contents leaving a larger space of air in the compartment which will cool of faster than usual. So, while the simple example has used a 10-on and 50-off scenario, we may see that this should normally be between 8-55 on and between 12-45 off. This normal variance is apparent from historical monitoring and knowledge about the equipment that has been deployed and can be used to trigger thresholds that generate alerts when equipment is not functioning as expected.

In addition to simple ranges of values, it may be that once a week the refrigerator is loaded and the personnel leave the door open while this is done. This may lead to one or more long cooling cycles during this period. Rather than immediately triggering an alert, the system can analyze the changes over time to see the values settle into the expected pattern to filter out the anomalies such as loading or unloading. In fact, the pattern may be extended to show additional parameters such as the triggering of the defrost cycle itself. In such a case, we would see the normal 10-on, 50-off pattern of the compressor but we would also see an expected defrost cycle driving up energy use at some expected interval. A threshold can be set to trigger if this defrost cycle fails to trigger or has started to trigger too often. Multiple scenarios can be set for any given piece of equipment. While a refrigerator used in the example may be limited to it's compressor, its defrost cycle and perhaps an icemaker, fan, and lights, an HVAC unit or other more complex machinery may have many more variables and many more patterns to monitor that can be saved into the database such that table of use patterns and deviations can be used to determine what may be causing the deviation from the expected power signature.

While the above examples were for a refrigerator, when it comes to an HVAC unit there are additional variables when considering HVAC equipment that may operate outside. Rather than a fixed 10-on, 50-off sequence as for a refrigeration compressor, in these cases outside temperature must be factored into the equation and a table of expected operation based on the delta temperature of the desired inside temperature and the outside temperature must be created. As an example, looking at HVAC in the summer months, when the temperature outside is between 60-70 only minimal compressor activity is expected. The system can actually blend outside air to meet the requirements of an interior 68 degree setpoint. However, if the temperature is in the 70-80 degree range outside, it is expected that the operation of the compressor on the HVAC unit would be on more often. The exact expectations are kept in a table based on prior knowledge of the system and historical measurement of the location. These ranges change again for 80-90 where the system would be expected to cycle more frequently. When temperature outside is over 100, is it expected that the system will be running quite often.

Other systems that involve heating, like say a hot water heater work in a similar fashion but heat to a given temperature and then allow the contents of the hot water tank to cool below a given threshold before starting the heating process again. Anomalies in such a system may involve a leaking pressure release valve or a leaking hot water tap causing heated water to leak out and thus increasing the number and length of water heating cycles.

Once the energy savings upgrades are done, it is expected that the reduction in the energy bill will provide sufficient savings to: (a) compensate the third-party for the additional negotiated savings, (b) pay the amortization of the capital costs over the time of the contract, and (c) provide sufficient profits for the first-party.

In addition to the negotiated savings amount, an additional threshold may be established that creates a ceiling of savings to be had by the first-party before an equitable split is made with the third-party. For example, if the third-party is saving 10% and the energy savings amount to over 20%, the first-party could split the savings achieved over 20% with the third-party. It should be noted that these numbers will be dependent on the particular circumstances including, for example, the capital expenditures paid, the negotiated terms, and the contract length.

The first-party will continue to collect and normalize the bills directly and once normalized; the first-party may generate its own monthly bill to the third-party. The first-party will be liable for and will pay the utility bills directly to the second-party and collect the amounts of its own normalized bill from the third-party.

Additional savings can be achieved by the first-party enrolling the third-party in various energy programs. Some of these may include:

Demand response. With additional equipment in place to control and monitor energy consumption, the system 100 from FIG. 1 has the ability to take advantage of demand response incentives 216 shown in FIG. 4 where on relatively short notice, the utility may demand a reduction in consumption during peak load times in exchange for a rebate.

Peak demand reduction: As many rates are based on peak usage measured by the utility in 15-minute increments 218, the monitoring features and control features of the system allow for some management and staggering of equipment turn on and cycling for high energy equipment. The equipment and cycling especially suitable for this type of control includes: defrost cycles, heaters, and cooling to offset spikes that might drive the third-party into a high peak. This type of integrated control reduces rates that can affect the overall utility bill issued by the second-party. To further expand on the importance of this point, overshooting a peak and landing in the next peak category can increase the total rate and thus the total electricity cost for multiple months or even a full year period.

Cap tagging management: Knowledgeable prediction using analytic capabilities to determine cap tag windows 220 in conjunction with the remote control and monitoring capabilities of the system 100 allows for curbing or limiting utilization where cap tagging is measured 222 thus potentially reducing usage costs and tariffs. While these windows are not generally known, there are ways to determine with high likelihood the expected windows and to leverage these predictions to obtain substantial savings.

Again, in the above cases, if there are savings to be had these can be shared between the first-party and the third-party to provide additional savings above and beyond the negotiated utilization-based rate discounts.

The system then operates on measuring and collecting the actual power usage data 224 collected from the third-party(ies) and based on all the forgoing data and information previously discussed, the first-party will remotely control the equipment 226 of the third-party (ies) to achieve the savings described above.

It should be further noted that as the first-party (energy management company) is directly responsible for multiple third parties (energy consumers), from the point of view of the second-party (utility), the first-party is considered the customer that oversees the combined energy consumption of all the third parties. For models such as the demand response model, it may be possible for the first-party to negotiate a better discount as it can conceivably offer the utility a large amount of Kw/hr savings as an aggregate from multiple facilities.

Figure 5:
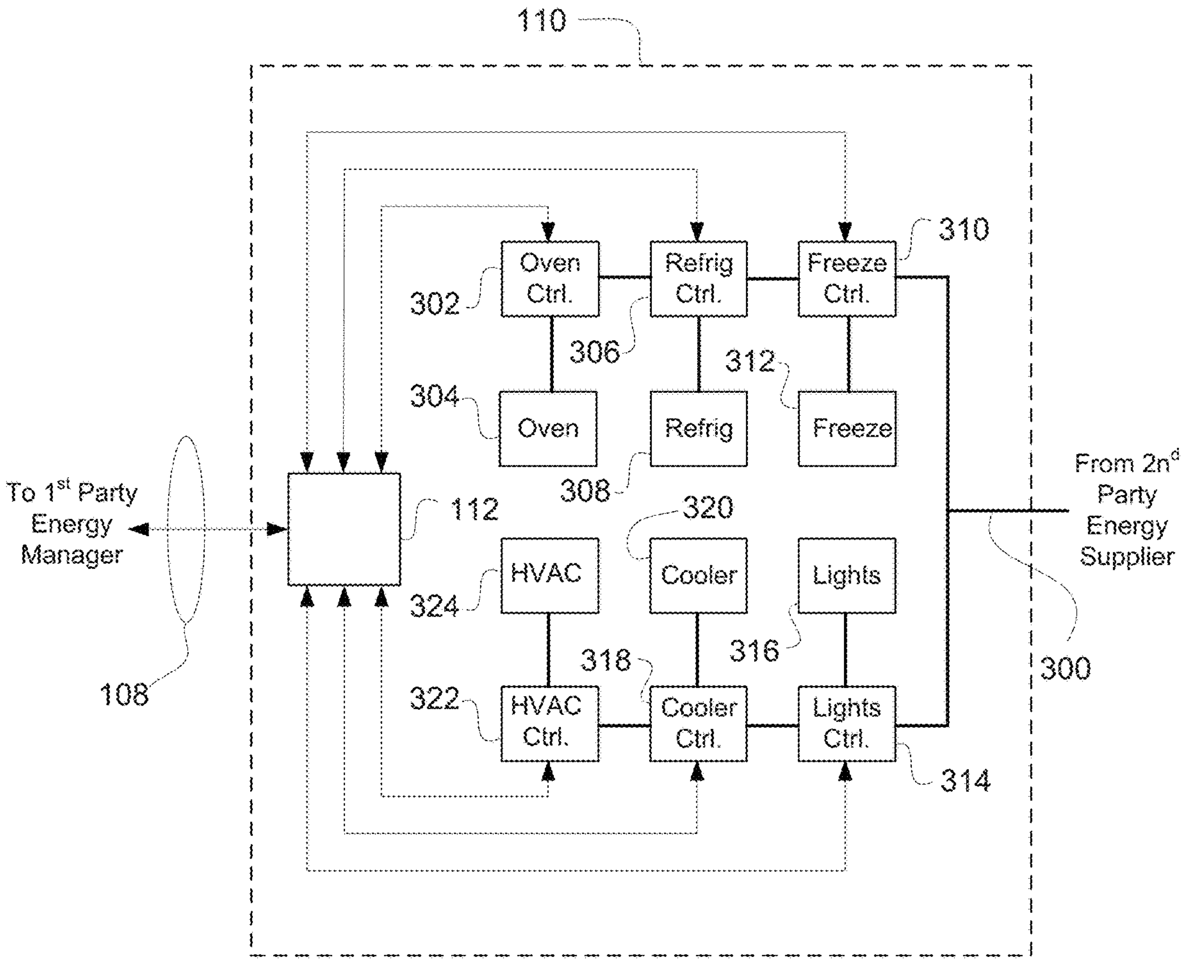
FIG. 5 is a block diagram according to FIG. 1.

Referring now to FIG. 5, an expanded view of third-party location 110 is provided showing some of the various equipment that may be found at the location. This list is illustrative and is not supposed to be comprehensive.

An optional controller 112 is shown in FIG. 5 that is coupled to the first-party computer 102 via a network connection 108. As stated previously, the controller 112 may or may not be utilized as it is conceived that each of the various equipment could be coupled directly to the first-party computer 102 via the network connection 108.

A power connection 300 is provided by the second-party (utility) to power the various equipment at third-party location 110. The first-party (energy management company) will install various control interfaces at the third-party location 110 to control the various equipment. Some of these types of control interfaces could be: an oven controller 302 for an oven 304; a refrigerator controller 306 for a refrigerator 308; a freezer controller 310 for a freezer 312; a lighting controller 314 for a lighting 316; a cooler controller 318 for a cooler 320; and a HVAC controller 322 for HVAC equipment 324. While the figure shows one controller for each piece of equipment, it is contemplated that each controller may comprise multiple individual controllers for individually controlling the various equipment in an independent manner. For example, the HVAC equipment 324 may comprise multiple pieces of equipment located as different locations around the facility that must be controlled in an independent fashion. Likewise, the lighting controller 314 may comprise a number of different controllers for independently controlling the lighting at the third-party location 112. Still further, some commercial locations may include the kitchen equipment listed along with many additional pieces of equipment. Alternatively, some retail locations may not include any kitchen equipment, but may have greatly expanded lighting needs and control features. All this will depend on the particular location and the particular use being made of the location.

The following outlines some of the installation plans and the observed energy savings that have been achieved.

Lighting Systems. Savings target-7%. Provides energy savings by replacing old, inefficient fluorescent or incandescent light fixtures with new Light Emitting Diode (LED) fixtures, and reducing the overall number of fixtures. The deployment includes presence sensors, metered switches, and changing pendant light to LEDs. Observed savings has been in a range of 60%-70%.

Figure 6:
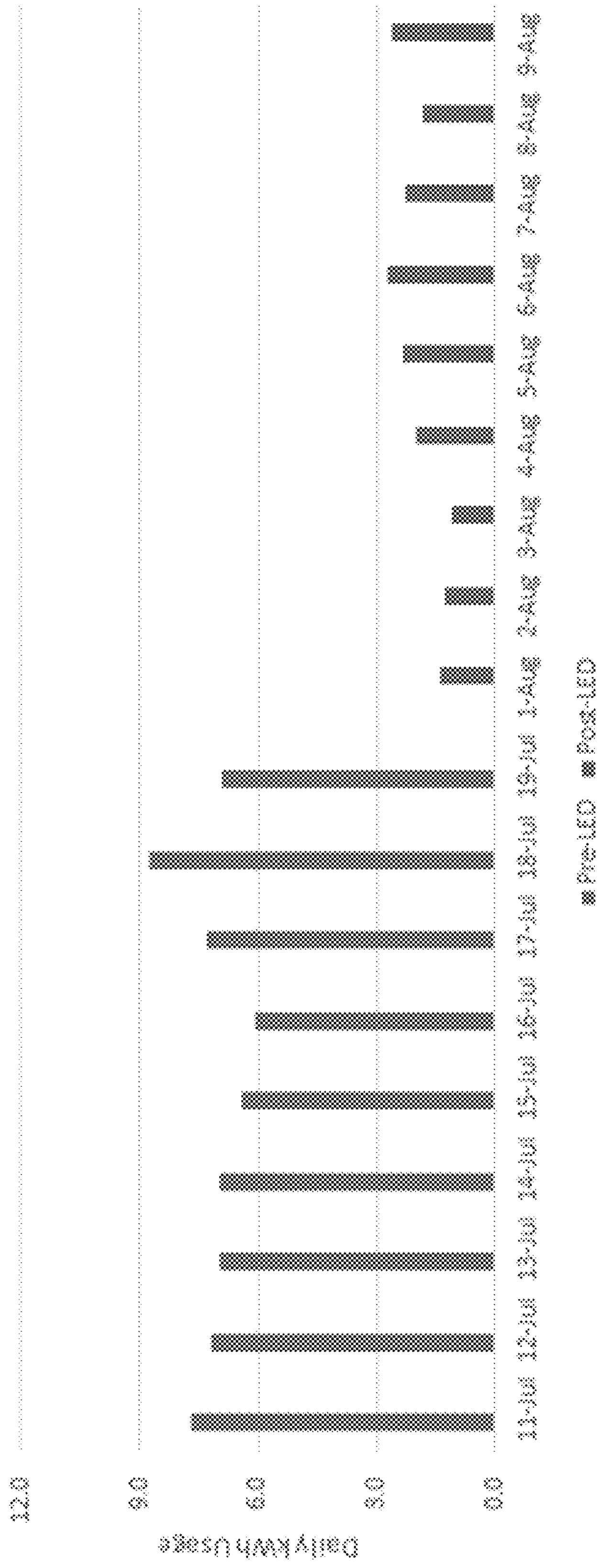
FIG. 6 is an example of pre-installation and post-installation energy usage of LED fixtures according to the system of FIG. 1.

FIG. 6 is an example of pre-installation and post-installation energy usage of LED fixtures at one retail location.

Refrigeration and Insulation. Savings target-1%. In-unit barrier that prevents warm air from entering the walk-in units when the door is open. Commonly referred to as "strip curtains", the long, flexible plastic strips allow shop personnel to move in and out of the unit while greatly reducing the flow of warm air into the unit. Observed savings has been in a range of 1%-2%.

Figure 7:
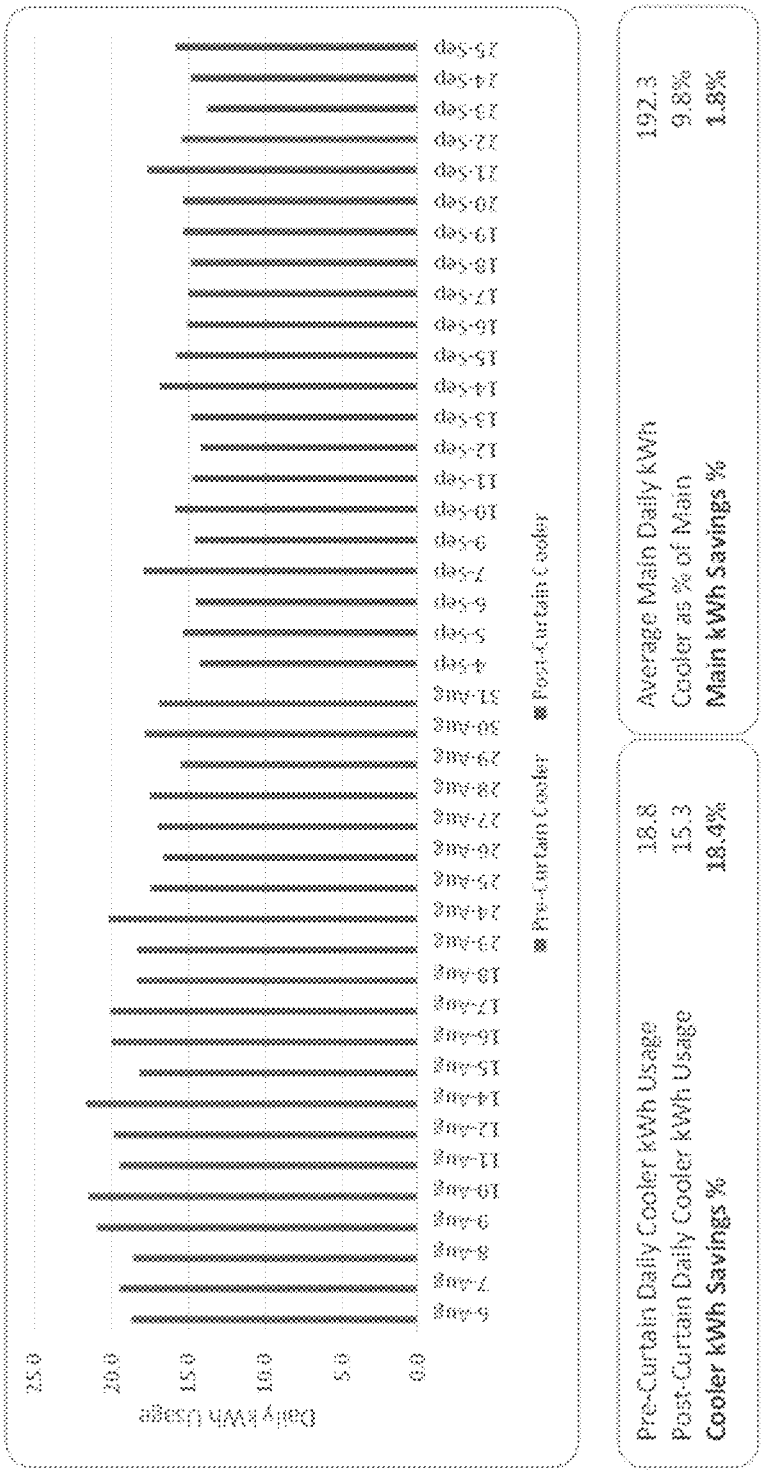
FIG. 7 is an example of pre-installation and post-installation energy usage of In-unit barrier for a cooler according to the system of FIG. 1.

FIG. 7 is an example of pre-installation and post-installation energy usage of In-unit barrier for a cooler at one commercial location.

Refrigeration Controller. Savings target-5%. The refrigeration controllers are designed to save energy in cooler and freezer systems. They reduce energy used by the system through precise control of refrigerant, fans, compressors, and by implementing demand defrosts (only defrosting when the coil frost reaches a certain level). The KE2 units also expand possibilities for Peak Demand Management. Observed savings has been approximately 6%.

Figure 8:
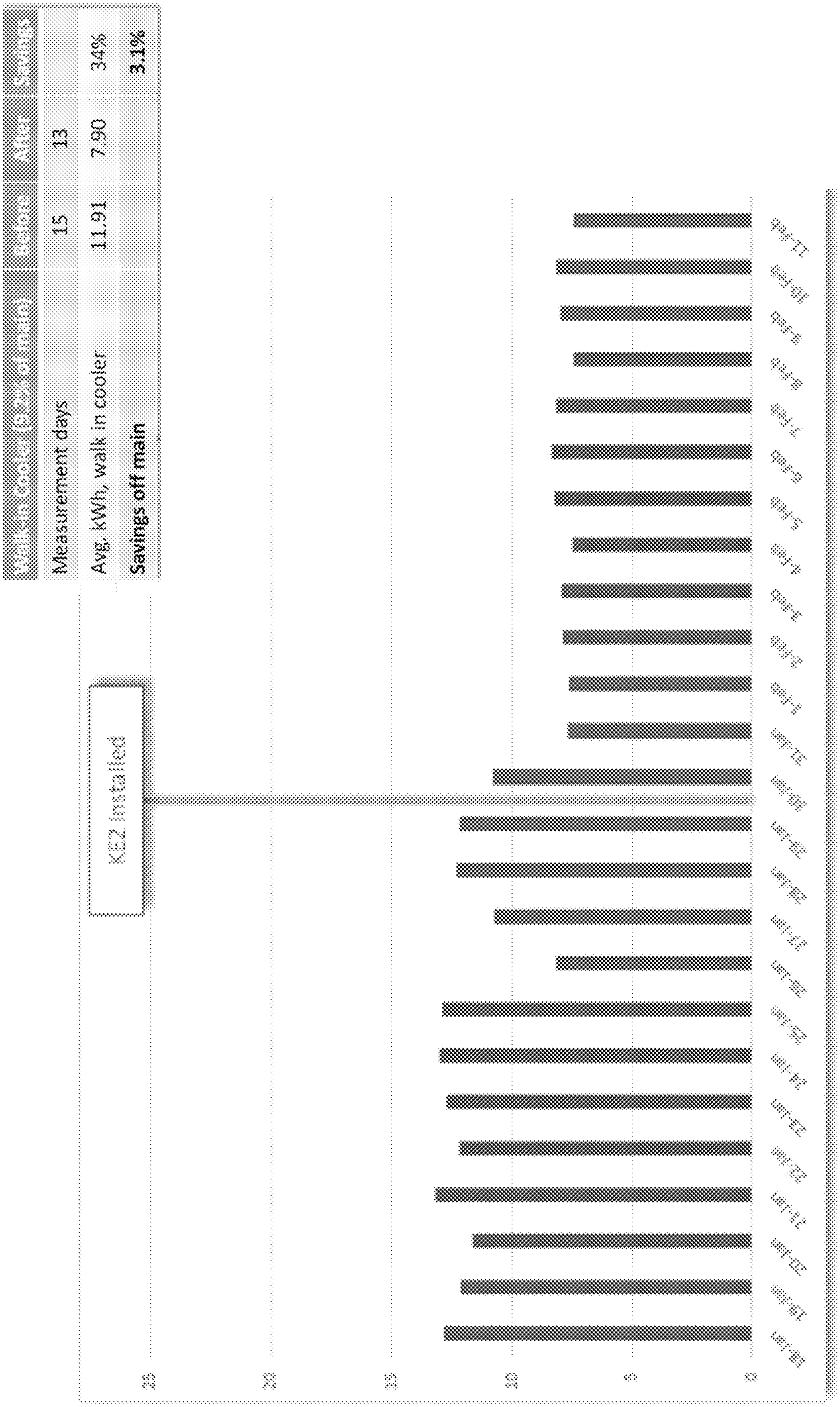
FIG. 8 is an example of pre-installation and post-installation energy usage of a KE2 evaporator efficiency system according to the system of FIG. 1.

FIG. 8 is an example of pre-installation and post-installation energy usage of refrigeration controllers for a cooler at one commercial location.

HVAC. Savings target-3%. Provides energy savings through increased efficiency of air conditioning compressors. Works by removing oil fouling present in the internal piping of the compressor, and then once clean, applying a Teflon coating to the pipes. This speeds the heat and cold transfer and improves refrigerant flow. Observed savings has been in a range of 2%-5%.

Figure 9:
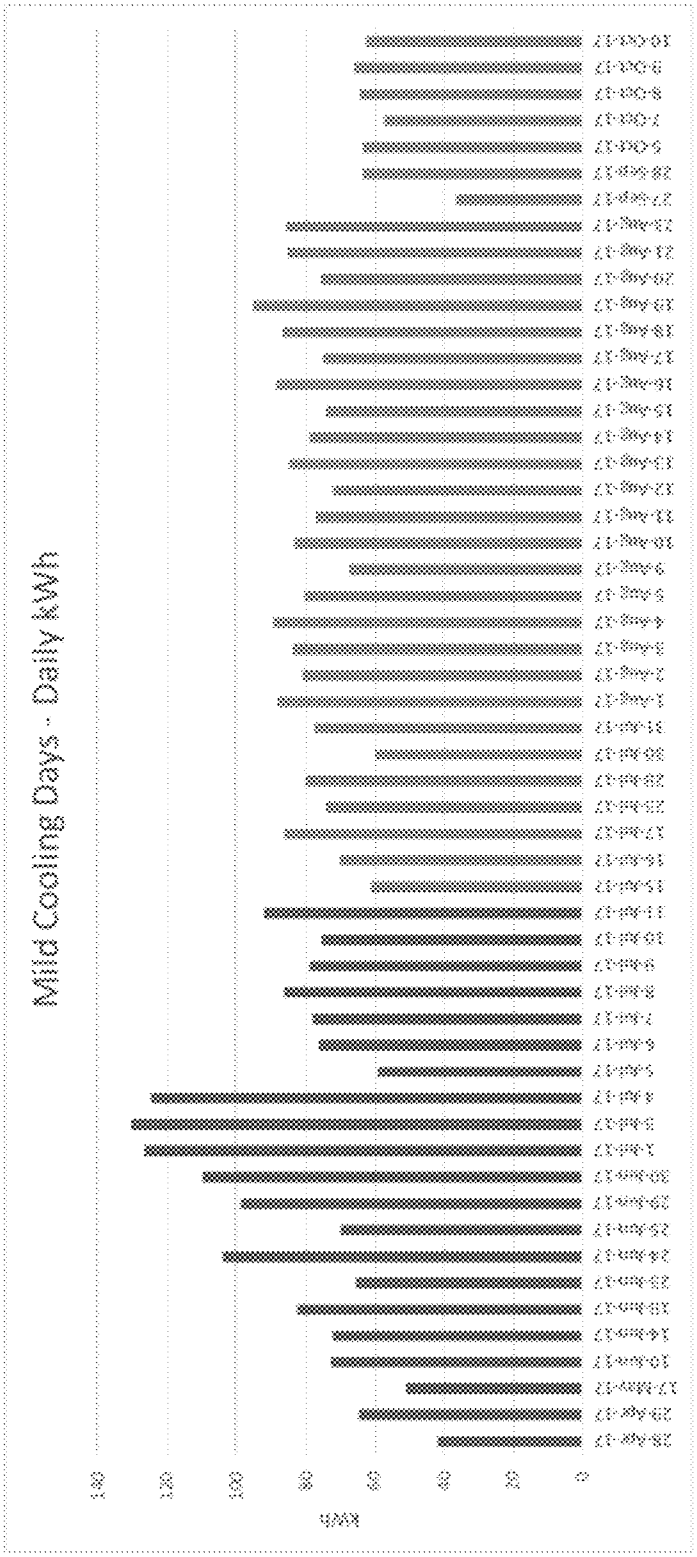
FIG. 9 is an example of pre-installation and post-installation energy usage of HVAC equipment according to the system of FIG. 1.

FIG. 9 is an example of pre-installation and post-installation energy usage of HVAC equipment at one commercial location.

Maintenance. Savings target-2%. Some shops have a Preventative Maintenance (PM) program, but many do not. Compressor coils can become encased in dust and dirt, filters require replacement, refrigerant leaks can occur, and all of these reduce the efficiency of a unit. Program results have varied widely.

Figure 10A:
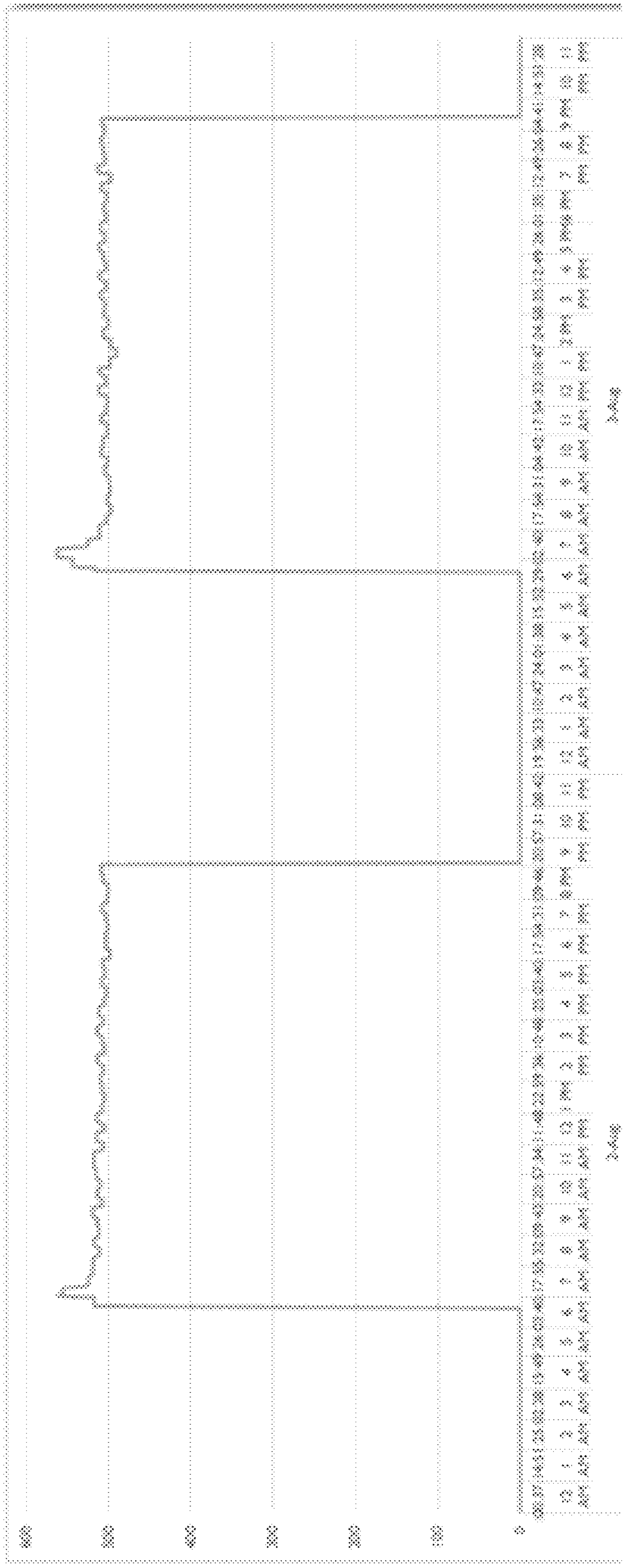
FIGS. 10A and 10B are an example of pre-installation and post-installation respectively of energy usage of a sandwich unit put on a preventative maintenance program according to the system of FIG. 1.
Figure 10B:
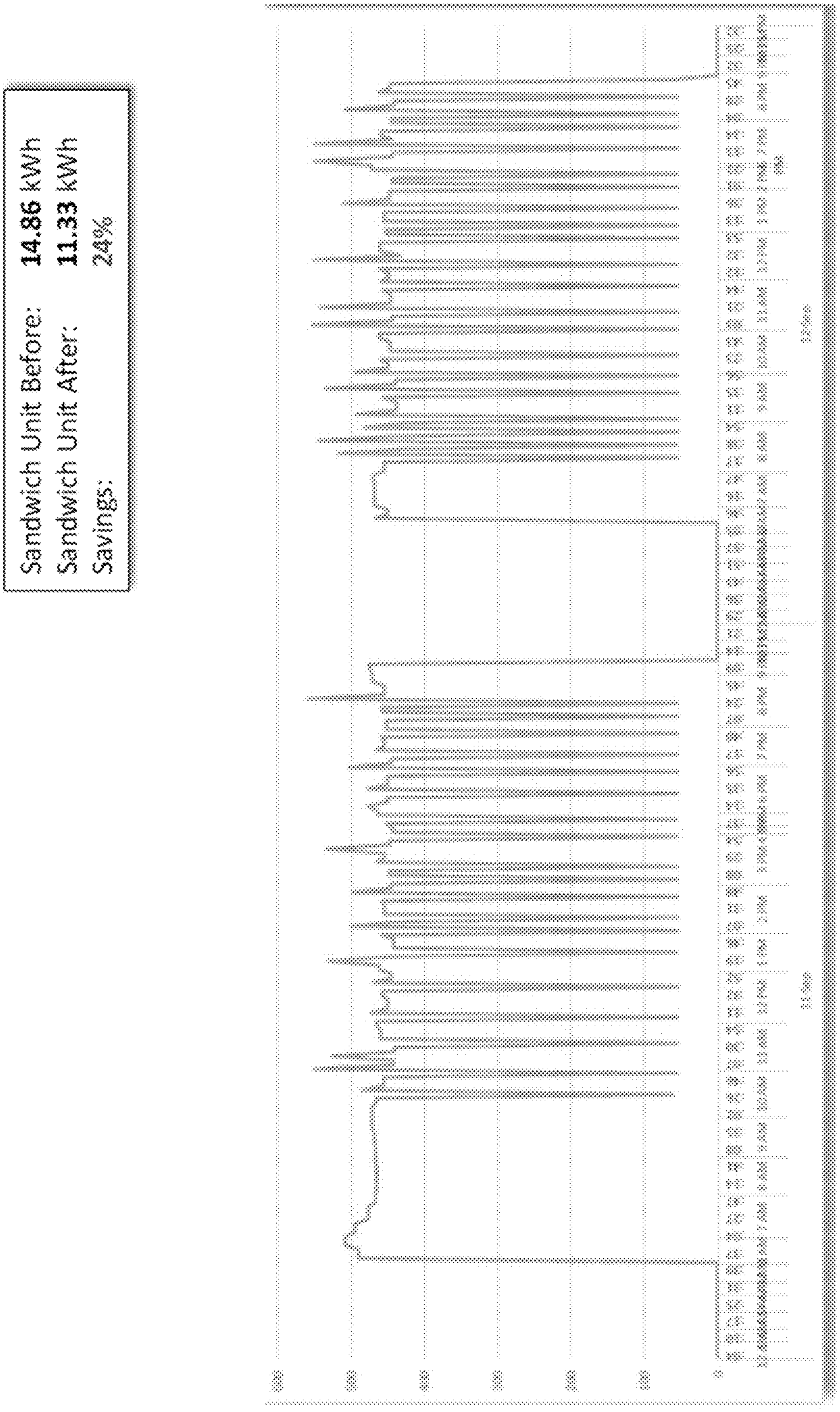
Figure 11:
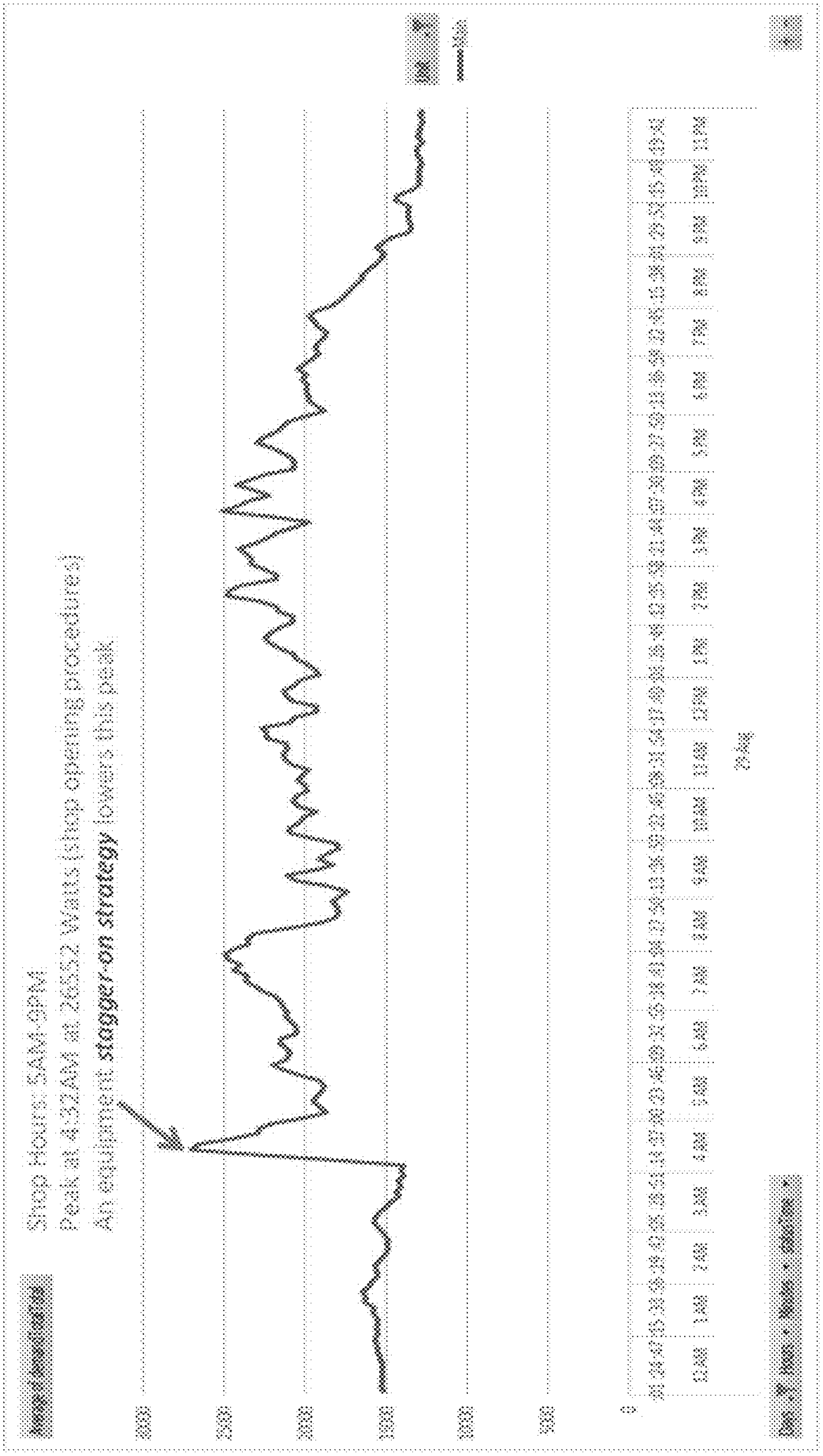
FIGS. 11-12 are examples of pre-installation and post-installation energy usage with PDM according to the system of FIG. 1.
Figure 12:
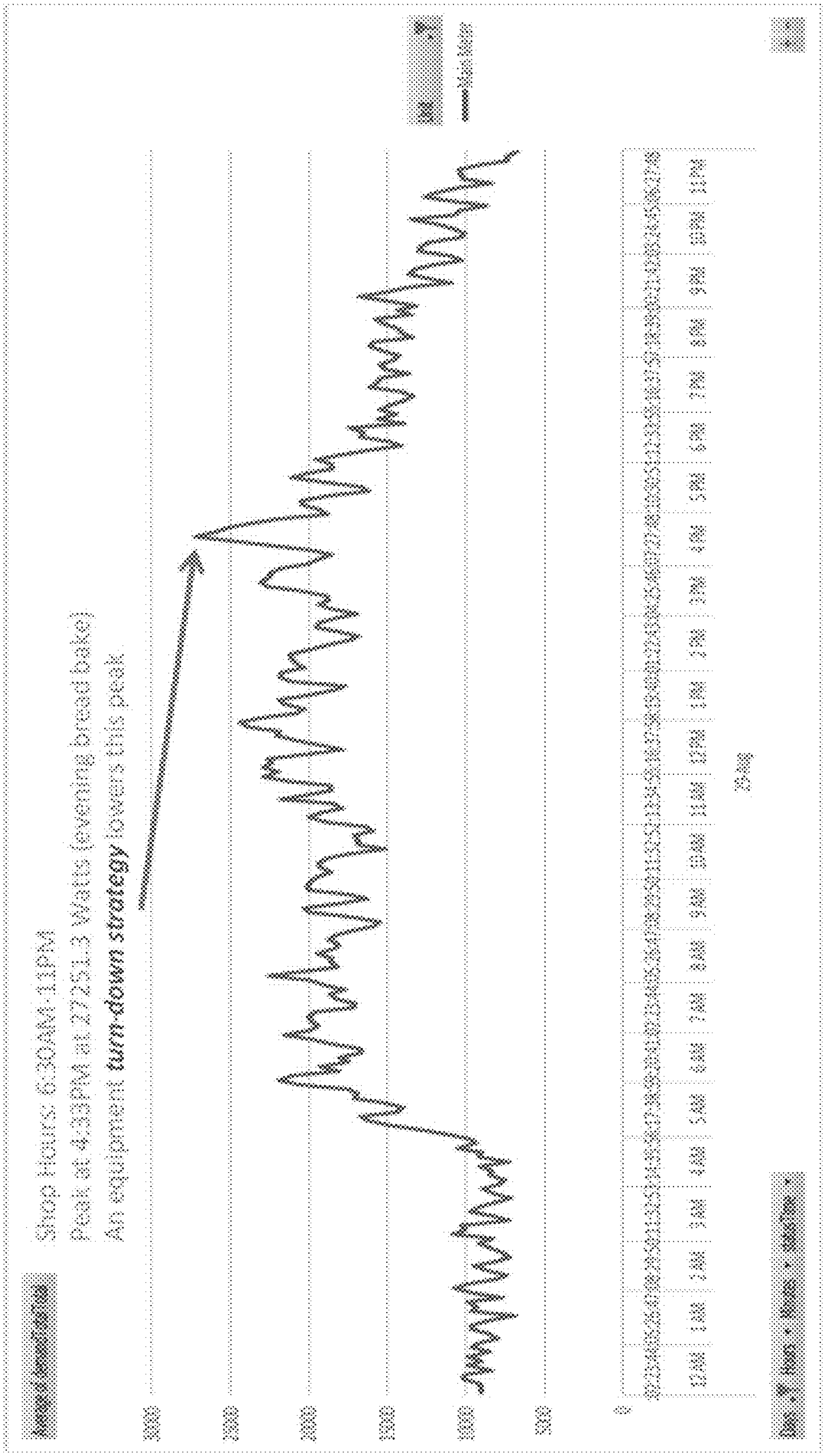
Figure 13A:
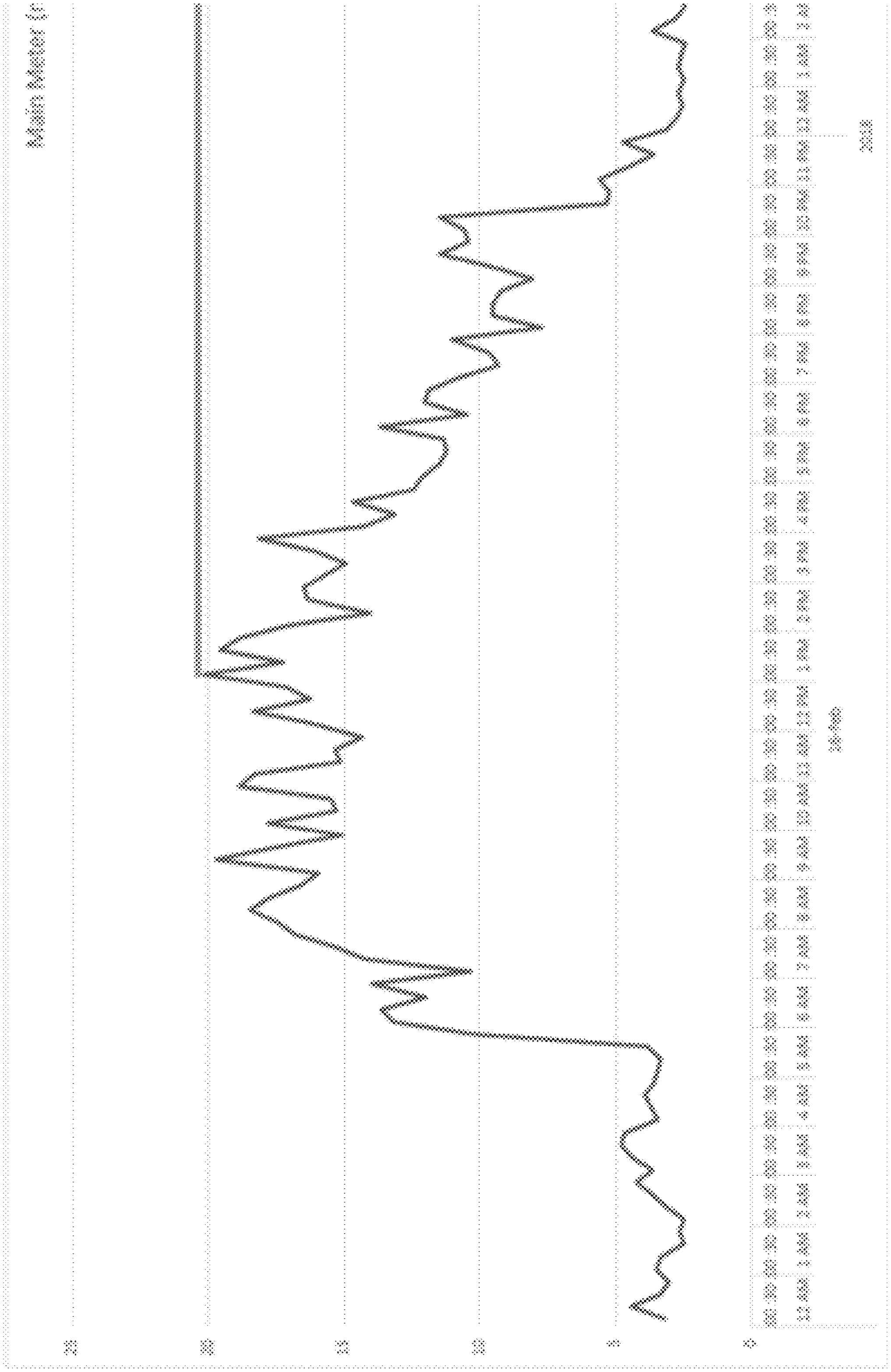
FIGS. 13A and 13B show a continuous graph illustrating examples of pre-installation and post-installation energy usage with PDM according to the system of FIG. 1.
Figure 13B:
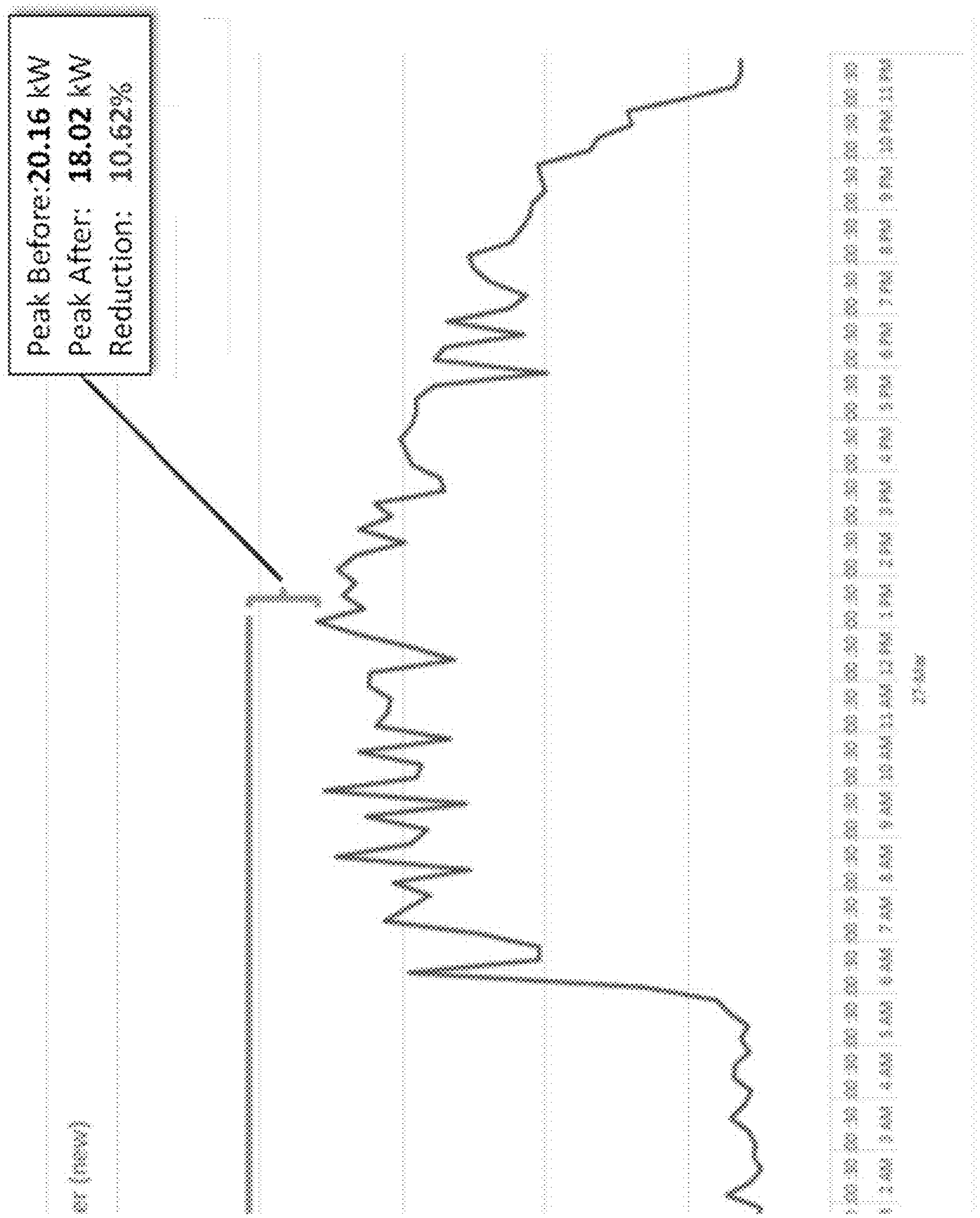

FIGS. 10A and 10B illustrate an example of pre-installation and post-installation energy usage of a sandwich unit put on a PM program at one commercial location.

Peak Demand Management. Peak Demand Management (PDM) Uses power on/off equipment either during shop power-on at opening, or when the system detects an approaching power peak (using data obtained from a measuring device). The specific actions taken in the staggered power-on solution for a commercial kitchen location are:

Sandwich units. Staggered power on via automated control.

Speed ovens. Staggered power on via automated control.

The specific turn-down actions are taken when a peak is approaching:

HVAC. Temperature set points are raised through the use of a thermostat when a peak is approaching via automated control.

Walk in cooler and freezer. Temperature set points are raised through the use of the KE2 via automated control.

Hot water heater. Turned off for 30 minutes via automated control.

Ice maker. Turned off for 60 minutes via automated control.

FIGS. 11, 12, 13A and 13B are examples of pre-installation and post-installation energy usage of PDM at various commercial locations. Additional measures to increase energy efficiency include:

Heat Exchanger. Uses waste superheat to heat water. Projected savings: 1.5-2%.

Variable Frequency Drives. Slows motor to run more efficiently and save power. Designed for use with fans and compressor motors.

Economizer. Cooler, outside air used in place of AC compressor. Sensors determine best cooling strategy. At times, it is projected up to 80-90% of HVAC can be eliminated.

ARC. VFD+Economizer+Controller+Advanced Rooftop Control. Single solution combines for target 10% savings.

Smart meters. Use of power "signatures" (analyzed power wave forms) to identify devices and capture data about the specific equipment in use to create a map of the specific equipment. APIs enable data integration with the system.

The following discussion will provide additional information on the structure, function and operation of the site evaluation tool and software.

In evaluating a potential site, an automated site evaluation tool is used which employs both domain experience from experts in the environmental and energy fields as well as machine learning from prior installations. This tool automates how the system comes up with the discount rate for the customer and the AMU used to calculate the bill we send (before actually receiving the energy bill).

The tool evaluates factors such as:

a. The size of the facility.
b. The Geographic location of the facility, or more specifically the Climate Zone.
c. Facing Sun, wind facing characteristics of building (number of external walls etc.).
d. The purpose of the facility (i.e. restaurant, factory, office building).
e. Layout of facility, for example is it a multi-tenant space or single tenant.
f. Whether an Office space or a combination of office/warehouse/manufacturing/etc.

Other components which go into the assessment calculations and determination of pricing include:

a. The existing equipment on site (age, size).
b. The environmental worthiness of the building (leaky, many windows etc.).
c. The traffic in and out of the building (door openings).
d. The amount of activity that is done (how many cycles for ovens etc.).
e. The historical and existing energy costs.
f. Metering data, this can be gathered before the upgrades or other installations are made to the facility and enable the obtaining of a baseline.

When plugging these values into the system, a determination is made as to which equipment must be changed, the approximate cost of the upgrades and the expected energy savings with the new equipment. Historical knowledge of similar facilities and their energy use combined with knowledge of the performance expectations when using the upgraded equipment aid in calculating expected usage. The cost of the upgraded equipment costs is also factored in. The end result is and expected AMU which will determine the discount rate for the facility.

Entering the type of equipment used by manufacturer provides information about the known reliability of such equipment. The age of the equipment and service history will also provide knowledge about the expected performance based on how historical data shows the equipment may degrade over time. Knowledge about the building location and how it faces the elements also adds knowledge of the environment in which the equipment will have to operate and its duty cycle.

It should be noted, that in addition to equipment upgrades and changes, the process also includes making changes to the Building Management System (BMS) configuration to improve efficiency and the review of air handlers to see if any are not functional.

In some cases, even a simple review of thermostat settings throughout the space is in order. In many sites, the HVAC system may be forced air while the heating is done through baseboard heaters. It's possible that when badly configured, both systems may be on simultaneously doing both heating and cooling which is clearly a waste.

Other systems have a dual mode that allows both heating and cooling, this too can lead to a switching between heat and cold if not well set with sufficient thresholds. For example, sun can come in the window warming up the thermostat causing a cooling cycle to bring the temperature down below the desired temperature. Then the heating system detects it is too cold, and starts warming the space up when a cloud passes over.

Once the system is operational, the actual usage curves are fed into the system and compared with the expected usage. This functions to fine-tune the system making future estimations even more accurate. The system takes the deep knowledge of experts in many areas to serve as a baseline and builds upon it with machine learning obtained from each of the installs. Such a group of experts could not scale to evaluate every site, and the ability to capture this know-how and build upon it makes the invention valuable and unique.

The process of pre-metering is also particularly useful to get real data from the site allowing a more accurate discount and AMU to be set.

While a site may be visited for evaluation and assessment as well as to tune the parameters of a BMS manually, this provides only one snapshot in time. Through the use of remote monitoring of other elements including environmental components such as weather, wind, UV levels, time of year or seasonality the parameters of the BMS can be continually tuned or adjusted. It may also be that the BMS is not suited to have one set of settings year-round but that these can be adjusted seasonally or when operation of the equipment is observed that is not optimal for reducing energy usage. Setting the system to an ideal setting mid-winter may involve a quick reaction time to turn on the heat so that occupants can get comfortable. These settings may give much worse performance in the summer or during season transitions where temperatures may hover around the optimal functioning to trigger both heating and cooling needs in different parts of the facility. In such an example, one may adjust to have wider temperature setpoints at various times of the year.

Either way, once the system is upgraded and tuned, before and after measurements are taken and the values expected are compared to the actual values measured by metering.

In addition to the above discussion which is primarily centered around reducing and monitoring usage, a large part of the savings that are obtainable also come from the management of peak usage and keeping usage demand in a narrower band. Utilities like to have usage remain constant and will reward users with lower rates that are able to minimize the differences between peak and non-peak demand.

Customers get their rates set based on the highest peak as measured by the utility. If one is able to keep that highest peak demand lower, the rates for the whole year can be lower, even if using the same amount of electricity or more. The key is to keep any single instantaneous peak down as low as possible. The installation and monitoring of metering equipment that is installed helps with this process.

The following real-life examples are presented to further illustrate and explain the present invention and should not be taken as limiting in any regard. Unless otherwise mentioned, all parts and percentages are by weight. All physical and mechanical measurements were conducted using industry standard test methods.

Figure 14:
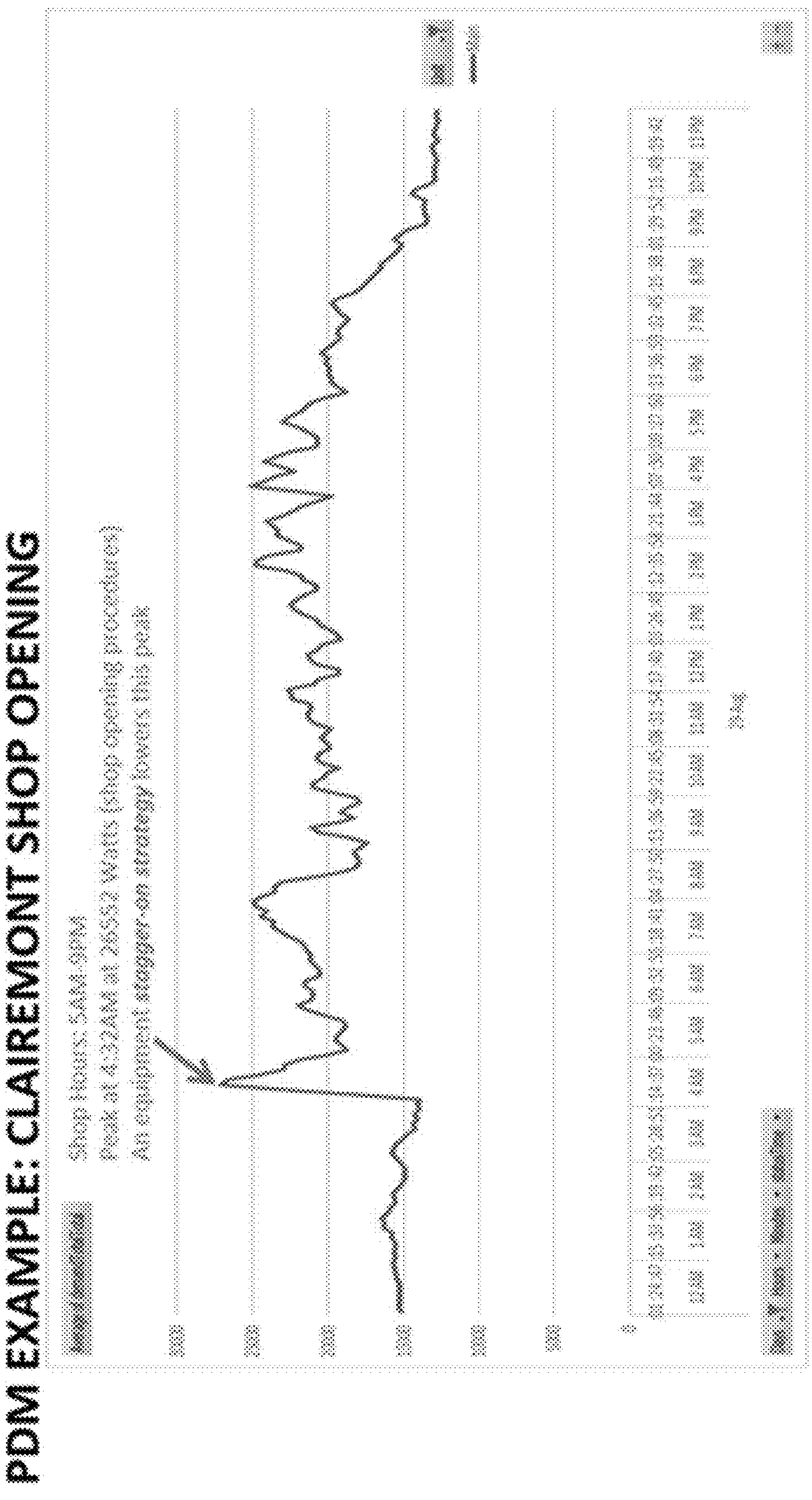
FIG. 14 is a graph illustrating energy consumption at locations where the system according to FIG. 1 may be utilized.

Referring now to FIG. 14 a sandwich shop in Clairmont starts up with the same set of procedures every morning. Employees show up to open the store and they turn on all the equipment to get the shop started. This includes the cooling or heating as the case may be to get the space to a comfortable temperature, the food warmers, ice makers and the lights. Fresh bread is also baked in the morning. Further, as items are retrieved from the refrigerator and freezer, these warm up and their compressors kick in to cool them back down to their setpoints. A peak energy usage can be relatively high when all this equipment is going at once.

This shop had implemented some simple procedural changes to minimize the spikes from occurring. For example, the manager would come in earlier and get the space cooled or heated to the appropriate temperature before any of the other equipment was turned on. The high-powered bread baking process would get started after the room was cooled, and then once the bread was ready, the other items would be started such as the ice makers, soup warmers and other items. Just this staggering of energy consuming devices by restricting how many things are running simultaneously, reduced the peak usage considerably. A chart showing energy usage is provided in FIG. 14.

It should also be noted that the automatic pre-cooling of a space can be triggered prior to the arrival of staff thus eliminating the need for a manager to come in earlier to offset the bread baking and HVAC starting. For safety reasons, we would not want to automate ovens or other fire hazards without personnel on site, but many items can indeed be started including ice makers and other refrigeration and warming devices. By starting these remotely and having the ability to stagger the start times, this eliminates labor cost of having to pay for additional time for people to come in earlier to manually start these, as well as allow for feedback from the metering inform when spikes and usage has subsided. i.e. the cooler has reached its setpoint temperature. Manual methods may be inexact, and simply listening to the compressor stop in a noisy environment is not practical.

Figure 15:
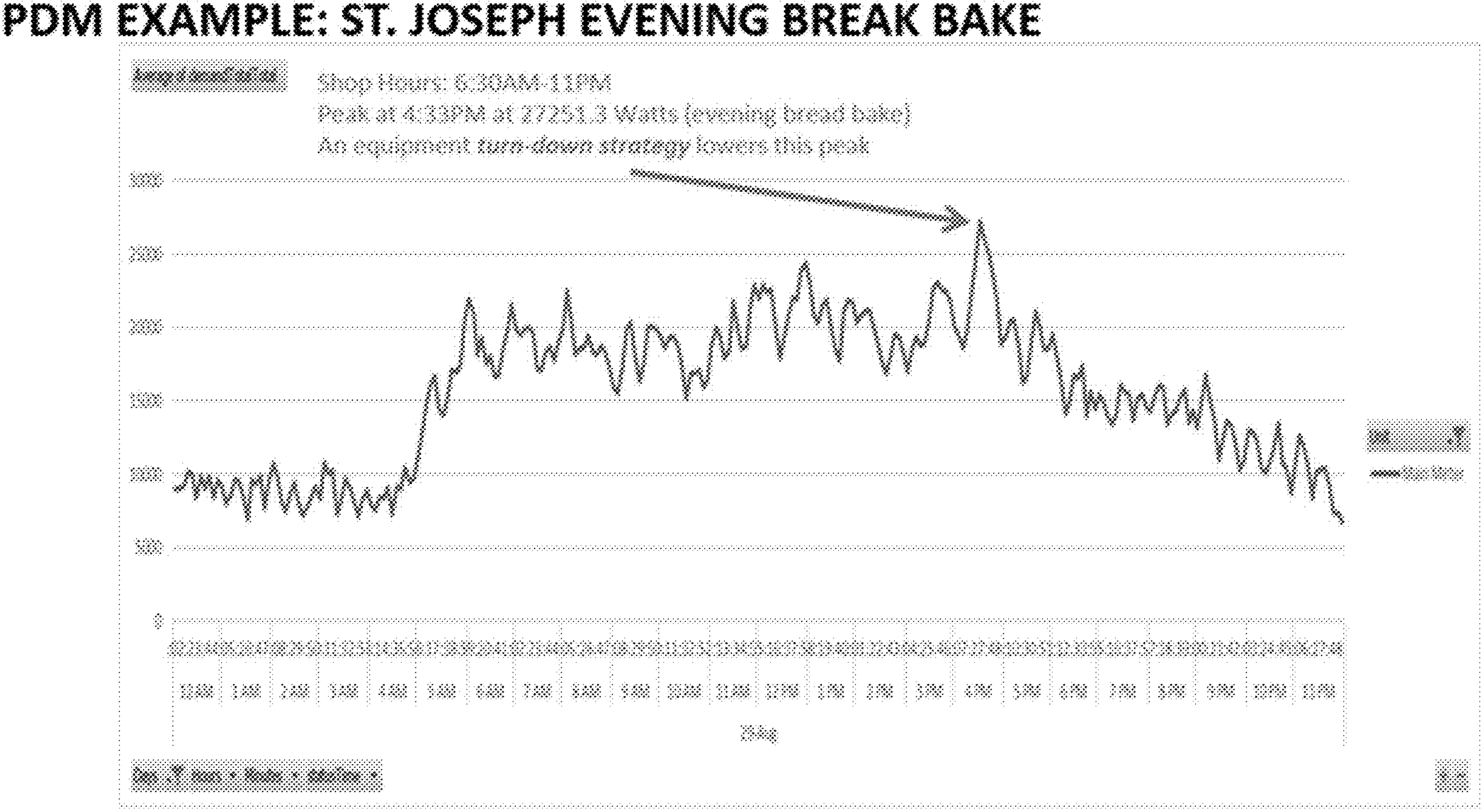
FIG. 15 is a graph illustrating energy consumption at locations where the system according to FIG. 1 may be utilized.

In another example, referring now to FIG. 15 a similar restaurant in St Joseph was baking bread in the evening. In this case, the bread bake cycle was started before all the other equipment was turned off, and by changing the procedures slightly a substantial difference in peak was achieved. By cycling certain elements such as soup warmers, icemakers and other equipment needed for daily serving and display of food before the bread baking cycle started reduced consumption sufficiently before the peak of bread baking arrived so that the peak was substantially lower.

Figure 16:
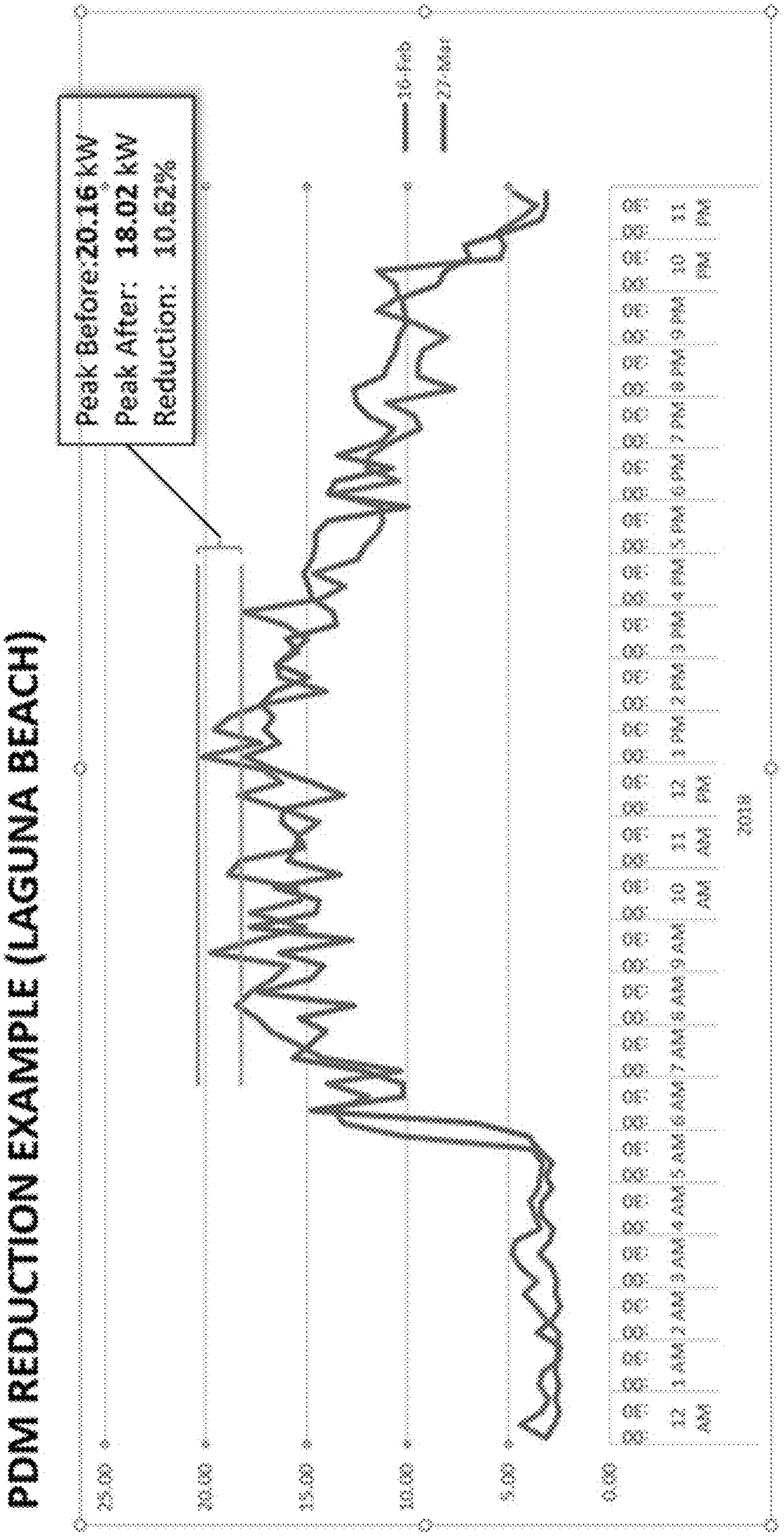
FIG. 16 is a graph illustrating energy consumption at locations where the system according to FIG. 1 may be utilized.

As a third example, referring now to FIG. 16 a shop in Laguna Beach staggered the starting of equipment and defrost cycles using automated controls tied to metering. As can be seen, even minor adjustments can make an overall impact on peak usage, and can lower costs substantially.

The invention has also been described with a component that allows for the adjustment of AMU and rates based on the monitoring and metering of usage. In a commercial real estate environment tenants can come and go, and the building managers or owners may have contracted the third-party energy management company with rates tied to an initial assessment.

Consider now the case where a commercial building adds a new tenant, such as a radiologist with an MRI machine or a company with a call center operation that operates 24/7, or an IT services company that has many racks of IT servers operating from the facility. These types of users may have an entirely different energy consumption profile than the prior space occupant.

Further, an existing tenant may take on a new line of business or offer a different service that drives considerably more (or less energy consumption). For example, a health club may begin offering “hot yoga” classes, thus driving up the energy profile. A production facility may add a new production line. A medical facility may add an MRI or XRAY machine.

Additional changes can occur in any number of ways, as a occupant may have adjusted specific usage patterns that cause energy consumption to vary dramatically. Here are a few examples:

a. A school will vary its schedules on a regular basis.
b. An office with field workers that brings their field workers in periodically for meetings or other events.
c. Companies that perform leader led, in-house training services.
d. Certain types of companies with specific manufacturing or production schedules.

In each of these cases, revisiting the usage profile, the discounts and the AMU are rightfully in order and should be expected by both parties. In these situations, metering takes place again and rates in all likelihood will be changed based on a new assessment.

While an initial site assessment tool is used that calculates and expected AMU based on historical usage and expected upgrades, there are invariably some elements which require additional tuning and research. Below is a sample installation and a description of the site and equipment found. This is for a small restaurant with seating for 20 making fast food.

An initial assessment of the site showed that the HVAC unit, hot water heater, and conventional lighting required changing to reach the desired savings levels. Additional enhancements to processes and procedures were also dictated based on the operation of the facility.

The project started with the installation of metering equipment and the following equipment was measured: lights, HVAC, hot water heaters, and ovens. A database of other similar equipment and sites allowed for the generation of predicted values for the upgraded equipment and adjustments to the operation of the equipment. A baseline with the current usage was established, which allowed the system to determine a realistic discount.

In this example, conventional lighting could be changed for modern LED lighting providing brighter lighting. As each LED light fixture provides more light output than the replaced older light fixture, fewer new light fixtures were needed and each LED light fixture consumes less power than the older fixtures.

The HVAC unit was a 15-year-old unit, so a more efficient energy-efficient unit was installed with a variable speed motor on the fan and compressor. Additional technology that would alternate mixing cool air from the rooftop blending it in with the air-conditioned air was added as well as a solar system to pressurize the HVAC coolant and the addition of coolant additives were used for additional savings.

A hot water heater estimated to be 10 years old and showing rust on the surface was also replaced with an energy efficient unit and due to the proximity to the HVAC unit, a heat exchanger was employed taking advantage of the coil heat to offset water heating costs.

Finally, when observing and discussing operating procedures, some enhancements were made to processes to reduce peak-demand when the opening and closing down the facility. These amounted to pre-cooling the facility before employees arrive to avoid the HVAC and the Lights and other equipment cycling simultaneously.

Monitoring of the energy consumption was initiated and the expected savings was measured to be slightly less than expected. A later analysis showed that the slightly above-estimate power consumption was attributable to an increase in business, which may have partially derived from the new lights making the establishment more inviting.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method of managing a third-party's energy usage for a facility with a computer having software executing thereon and a storage and coupled to a network comprising the steps of:

the computer receiving a first energy usage for the facility for a first period of time corresponding to the third-party's past energy usage for the first period of time;

the computer receiving a second energy usage for the facility for a second period of time corresponding to the third-party's past energy usage for the second period of time;

the software executing on the computer determining a baseline energy usage based on the first and second energy usages, the software executing on the computer applying a discount rate to the baseline energy usage to generate a discounted baseline energy usage, the discount rate based on an expected reduced energy usage for the facility;

the software executing on the computer generating an energy bill for a third period of time;

issuing the energy bill from a first-party to the third-party for a current billing period prior to an end of the current billing period and prior to all actual energy usage by the third party for the current billing period wherein the energy bill is an actual energy bill for the third party;

wherein the first-party is obligated to pay a utility bill issued by a second-party for energy usage of the facility during the current billing period;

measuring an actual energy usage of a plurality of pieces of equipment at the facility with a plurality of sensors connected to the network to generate measured energy usage;

transmitting the measured energy usage to the computer via the network;

software executing on the computer comparing the actual energy usage to the discounted baseline energy usage; and the computer measuring an actual energy signature of the plurality of pieces of equipment with the plurality of sensors to generate an measured power signature for the plurality of pieces of equipment and comparing the measured power signature to a baseline energy signature, which is an baseline energy signature and the baseline energy signature the computer adjusting operation of one or more of the plurality of pieces of equipment when the measured power signature deviates a threshold value from the baseline energy signature;

wherein the measured power signature and baseline energy signature represent analyzed power wave forms.

2. The method according to claim 1, wherein the baseline energy signature is dynamic such that it is adjusted based on environmental factors.

3. The method according to claim 2, wherein the environmental factors that are used to adjust the baseline energy signature are selected from the group consisting of: an air temperature, a humidity, a sun-exposure factor on at least a portion of the facility, a heat index, a wind measurement, a date, a time of day, a season, a geographic location and combinations thereof.

4. The method according to claim 1, wherein a filter is used to filter out deviations of the measured power signature from the baseline energy signature when a deviation occurs for a time duration of less than a time period (T).

5. The method according to claim 1, wherein if the deviation equals or exceeds time period (T), the equipment alert is generated.

6. The method according to claim 1, wherein the database of information includes power signature information corresponding to a probable malfunction for the one of the plurality of pieces of equipment.

7. The method according to claim 6, wherein the power signature information saved in the database includes data relating to On/Off times, power consumption and combinations thereof for the one of the plurality of pieces of equipment.

8. The method according to claim 6, wherein when the system determines a probable malfunction based on a comparison of the measured power signature to the power signature information saved in the database, the probable malfunction is transmitted to a mobile device.

9. The method according to claim 6, wherein the probable malfunction is selected from the group consisting of: defrost malfunction, compressor malfunction, fan related functions, failed seals of compartment and combinations thereof.

10. A method of managing a third-party's energy usage for a facility with a computer having software executing thereon and a storage and coupled to a network comprising the steps of:

the computer receiving a first energy usage for the facility for a first period of time corresponding to the third-party's past energy usage for the first period of time;

the computer receiving a second energy usage for the facility for a second period of time corresponding to the third-party's past energy usage for the second period of time;

the software executing on the computer determining a baseline energy usage based on the first and second energy usages, the software executing on the computer applying a discount rate to the baseline energy usage to generate a discounted baseline energy usage, the discount rate based on an expected reduced energy usage for the facility;

the software executing on the computer generating an energy bill for a third period of time;

issuing the energy bill from a first-party to the third-party for a current billing period prior to an end of the current billing period;

wherein the first-party pays a utility bill issued by a second-party for energy usage of the facility during the current billing period;

measuring an actual energy usage of a plurality of pieces of equipment at the facility with a plurality of sensors connected to the network to generate measured energy usage;

transmitting the measured energy usage to the computer via the network;

software executing on the computer comparing the actual energy usage to the discounted baseline energy usage; and wherein baseline energy signature for one of the plurality of pieces of equipment is derived based in part on information from a database including an expected power usage pattern based on manufacturer standards or previously determined usage patterns for the one of the plurality of pieces of equipment or combinations thereof, and wherein a measured power signature of the one of the plurality of pieces of equipment determined by said software the computer measuring an actual energy signature of the plurality of pieces of equipment with the plurality of sensors to generate the measured power signature for the plurality of pieces of equipment and comparing the measured power signature to an baseline energy signature and and said software compares the measured power signature to the baseline energy signature and when the measured power signature deviates a threshold value from the baseline energy signature, the computer adjusting operation of one or more of the plurality of pieces of equipment;

wherein the measured power signature and baseline energy signature represent analyzed power wave forms.

11. The method according to claim 10, wherein the baseline energy signature is dynamic such that it is adjusted based on environmental factors.

12. The method according to claim 11, wherein the environmental factors that are used to adjust the baseline energy signature are selected from the group consisting of: an air temperature, a humidity, a sun-exposure factor on at least a portion of the facility, a heat index, a wind measurement, a date, a time of day, a season, a geographic location and combinations thereof.

13. The method according to claim 10, wherein a filter is used to filter out deviations of the measured power signature from the baseline energy signature when a deviation occurs for a time duration of less than a time period (T).

14. The method according to claim 10, wherein if the deviation equals or exceeds time period (T), the equipment alert is generated.

15. The method according to claim 10, wherein the database of information includes power signature information corresponding to a probable malfunction for the one of the plurality of pieces of equipment.

16. The method according to claim 15, wherein the power signature information saved in the database includes data relating to On/Off times, power consumption and combinations thereof for the one of the plurality of pieces of equipment.

17. The method according to claim 15, wherein when the system determines a probable malfunction based on a comparison of the measured power signature to the power signature information saved in the database, the probable malfunction is transmitted to a mobile device.

18. The method according to claim 15, wherein the probable malfunction is selected from the group consisting of: defrost malfunction, compressor malfunction, fan related functions, failed seals of compartment and combinations thereof.

* * * * *